US009888452B2

(12) United States Patent
Logan et al.

(10) Patent No.: US 9,888,452 B2
(45) Date of Patent: Feb. 6, 2018

(54) METHODS AND APPARATUS NOTIFYING A USER OF THE OPERATING CONDITION OF A HOUSEHOLD APPLIANCE

(71) Applicant: Twin Harbor Labs, LLC, Plano, TX (US)

(72) Inventors: James D Logan, Candia, NH (US); Eric Carr, Plano, TX (US); Richard A Baker, Jr., West Newbury, MA (US)

(73) Assignee: Twin Harbor Labs LLC, Plano, TX (US)

( * ) Notice: Subject to any disclaimer, the term of this patent is extended or adjusted under 35 U.S.C. 154(b) by 0 days.

(21) Appl. No.: 15/201,451

(22) Filed: Jul. 3, 2016

(65) Prior Publication Data
US 2017/0105190 A1   Apr. 13, 2017

Related U.S. Application Data

(63) Continuation-in-part of application No. 14/880,883, filed on Oct. 12, 2015, now Pat. No. 9,386,140, which
(Continued)

(51) Int. Cl.
*H04W 68/00* (2009.01)
*H04M 1/725* (2006.01)
(Continued)

(52) U.S. Cl.
CPC ............ *H04W 68/00* (2013.01); *G05B 15/02* (2013.01); *G05B 19/042* (2013.01);
(Continued)

(58) Field of Classification Search
CPC .. G05B 2219/24107; G05B 2219/2642; G05B 19/0428; G07C 3/00; G08B 1/08;
(Continued)

(56) References Cited

U.S. PATENT DOCUMENTS 4,916,439 A   4/1990   Estes et al.
5,089,809 A   2/1992   Carmichael, Jr.
(Continued)

FOREIGN PATENT DOCUMENTS

CH   101408768   9/2008
GB   2419210   4/2006

OTHER PUBLICATIONS

Mounia Mostefaoui, "Sebastien Christian, CEO of Otosense, Inc: "Why I chose French Tech Hub"", http://blog-frenchtechhub-prime.com/2014/03/27/sebastien-christian-ceo-of-otosense-inc-why-i-chose-french-tech-hub/, downloaded on Sep. 24, 2014.
(Continued)

*Primary Examiner* — Mirza Alam

(57) ABSTRACT

Sounds, alarms or other indications of conditions of potential interest that are produced by appliances and other household devices are detected by one or more sensors to trigger a notification signal that is sent to a remotely located user. The signals produced by the sensors are advantageously compared with a database of signals representing conditions of potential interest produced by known appliances and devices, producing the appropriate notification signal when a match is found. Notifications may be relayed to one or more selected users only when predetermined conditions are satisfied.

20 Claims, 15 Drawing Sheets

Related U.S. Application Data is a continuation-in-part of application No. 14/682,152, filed on Apr. 9, 2015, now Pat. No. 9,159,217.

(60) Provisional application No. 61/977,786, filed on Apr. 10, 2014, provisional application No. 62/027,062, filed on Jul. 21, 2014.

(51) Int. Cl.

| | | |
|---|---|---|
| *H04W 4/00* | (2009.01) | |
| *H04W 4/14* | (2009.01) | |
| *G05B 15/02* | (2006.01) | |
| *G05B 19/042* | (2006.01) | |
| *G07C 3/00* | (2006.01) | |
| *H04M 19/04* | (2006.01) | |
| *H04W 4/16* | (2009.01) | |

(52) U.S. Cl.
CPC .......... *G05B 19/0428* (2013.01); *G07C 3/00* (2013.01); *H04M 1/72533* (2013.01); *H04M 19/047* (2013.01); *H04W 4/008* (2013.01); *H04W 4/14* (2013.01); *H04W 4/16* (2013.01); G05B 2219/24015 (2013.01); G05B 2219/24048 (2013.01); G05B 2219/24107 (2013.01); G05B 2219/2613 (2013.01); G05B 2219/2642 (2013.01)

(58) Field of Classification Search
CPC ... G08B 13/1418; G08B 25/006; G08B 5/224
USPC ..... 340/539.1, 539.11, 511.2, 679, 531, 500, 340/5.7, 539.22, 539.26; 702/141, 189, 702/32, 33, 104, 176, 183; 65/29.15, 158
See application file for complete search history.

(56) References Cited

U.S. PATENT DOCUMENTS

| | | | |
|---|---|---|---|
| 5,285,375 A | 2/1994 | Kim | |
| 5,586,174 A | 12/1996 | Bogner et al. | |
| 5,757,643 A | 5/1998 | Kuroda et al. | |
| 6,021,324 A * | 2/2000 | Sizer, II | H04M 1/6505 340/679 |
| 6,424,252 B1 | 7/2002 | Adler | |
| 8,594,969 B2 | 11/2013 | Lill et al. | |
| 2002/0073183 A1* | 6/2002 | Yoon | G05B 19/0421 709/220 |
| 2003/0058101 A1* | 3/2003 | Watanabe | G08B 13/1418 340/540 |
| 2003/0080875 A1* | 5/2003 | Wathen | G07C 9/00182 340/12.22 |
| 2003/0179746 A1* | 9/2003 | Moon | D06F 39/005 370/352 |
| 2010/0286801 A1 | 11/2010 | Yum et al. | |
| 2011/0246124 A1* | 10/2011 | Lill | G05B 19/0428 702/141 |
| 2013/0049970 A1 | 2/2013 | Finch et al. | |
| 2013/0106613 A1* | 5/2013 | Lee | H04W 4/021 340/691.3 |
| 2014/0132418 A1 | 5/2014 | Lill et al. | |
| 2015/0061862 A1* | 3/2015 | Lee | H04M 1/7253 340/539.11 |

OTHER PUBLICATIONS

OtoSense, "Vision", http://www.otosense.com/#!about-us/coqt, downloaded on Nov. 5, 2014.
"Receiving SMS Notifications From Your Washer & Dryer", http://alexba.in/blog/2014/01/06/receiving-sms-notifications-from-your-washer/, Jan. 6, 2014.
"Washer Dryer Laundry Alarm using Arudino & SMS Text Messaging Alerts", http://www.instructables.com/id/Washer-Dryer-Laundry-Alarm-using-Arudino-SMS-Text-/, Jan. 5, 2014.
"Wireless Arduino Home Automation w/ OpenHAB", http://hackaday.io/project/1720-20-wireless-arduino-home-automation-w-openhab, Aug. 2014.
"Samsung Smart Washer/Dryer", https://play.google.com/store/apps/details?id=com.samsung.washer&hl=en, Dec. 10, 2014.
Newton, Thomas, "IFA 2013: LG Smart ThinQ Kitchen Android app and concept hands-on video", https://recombu.com/digital/article/lg-smart-thinq-kitchen-android-app-and-concept-hands-on-pictures_M12103.html, Dec. 6, 2013.
AFP, "Online homes becoming mindful members of the family", Daily Mail, http://www.dailymail.co.uk/wires/afp/article-2903306/Online-homes-mindful-members-family.html, Feb. 9, 2015.
Cable, Amanda, "How to feed the dog, cook dinner and do the washing even though you're miles away . . . courtesy of your mobile phone", Daily Mail, http://www.dailymail.co.uk/sciencetech/article-2576057/How-feed-dog-cook-dinner-washing-youre-miles-away-courtesy-mobile-phone.html, Mar. 7, 2014.
Skipworth, Hunter, "A beginner's guide to connected homes: Tips to add tech to your house", Digital Spy, http://www.digitalspy.com/tech/all-hands-on-tech/a525531/a-beginners-guide-to-connected-homes-tips-to-add-tech-to-your-house.html#~p9bbsWCcq6zDLO, Oct. 25, 2013.
"Dryer Bro by By Dryer Bro", http://dryer-bro.appsios.net/, Dec. 20, 2012.

* cited by examiner

METHODS AND APPARATUS NOTIFYING A USER OF THE OPERATING CONDITION OF A HOUSEHOLD APPLIANCE

CROSS REFERENCE TO RELATED APPLICATIONS

This patent application is a Continuation-in-part application of, and claims the benefit of, U.S. patent application Ser. No. 14/880,883, filed on Oct. 12, 2015, now U.S. Pat. No. 9,386,140, incorporated herein by reference. U.S. Pat. No. 9,386,140 is a Continuation-in-part application of, and claims the benefit of, U.S. patent application Ser. No. 14/682,152, filed on Apr. 9, 2015, now U.S. Pat. No. 9,159,217, incorporated herein by reference. U.S. patent application Ser. No. 14/682,152 is a non-provisional application of, and claims the benefit of the filing dates of, U.S. Provisional Patent No. 62/027,062 filed on Jul. 21, 2014 entitled Washer Dryer Alarm and of U.S. Provisional Patent No. 61/977,786 filed on Apr. 10, 2014 entitled Personal Household Notification Relay Device. The disclosures of both of these provisional patent applications are incorporated herein by reference.

FIELD OF THE INVENTION

This invention relates to methods and apparatus for notifying a user of appliances and devices of the status of those devices when the user is not nearby.

BACKGROUND OF THE INVENTION

The present invention recognizes sounds from real world objects and notifies the user. For example, the user may put a chicken in the oven for an hour and go outside to play ball not having to worry about when to come in. Although the user could set an alarm on their phone, the present invention removes this time consuming step. The user can avoid having to set two alarms or having to hang around the kitchen for alarms to go off by employing a sensing device for detecting the conventional alarm signal produced by the oven and notifying the user who is no longer nearby.

The present invention not only relays notification messages in response to sounds from real world objects such as microwaves, ovens, and stoves but can also be programmed the to recognize any unique sound or vibration whose occurrence should be called the user's attention. The device employs pattern and template recognition of sounds to notify the user of events within the acoustic range of the device. Different notification messages can be produced to indicate different conditions, different devices and different events being monitored.

To determine the operating status of an appliance or device in a household, the user generally must be near the appliance or device in question. A dishwasher may buzz upon completion of a drying cycle, but the only way a user may know the drying cycle is complete is to either hear when the dishwasher buzzes or return to the dishwasher to check its status. Similarly, other kitchen appliances, hardware, and devices that make noise, vibrate, or otherwise signal that an operation has completed or begun must be located nearby to be monitored.

Devices and methods for monitoring the washer and dryer exist. However, once a user starts on operation with the washer and dryer they may not wait in close enough proximity to know when the operation has stopped. Washers and dryers stop at different times depending on the size of the load and the settings chosen for the washer and dryer. Many washers and dryers have alarms or buzzers that signal when a load is done but some do not. These alarms only work if the user is close enough to hear the alarm. The time it takes for a washer and dryer to complete a cycle may be unknown or easily forgotten by the user. If the user, or attendant, does not attend to the laundry promptly when a washing or drying cycle is completed clothes may become moldy in the case of wet clothes or wrinkled in the case of dried clothes. In addition, the person's work schedule may be affected by virtue of the fact that it was not known that the pertinent laundry process had ended.

The operating state of an appliance may be monitored by measuring the magnitude of household current the appliance draws. Unfortunately, the current level may drop if the appliance pauses or performs other functions during normal operation. Timing devices have been used to indicate the completion of an operation, but will be inaccurate when the appliance alters its operating cycle to adjust for special conditions; for example, some dryers have moisture sensors which automatically adjust the operation time based on the level of moisture inside the dryer.

A program (app) called DryerBro is available through Apple's iTunes App Store that converts an iPhone or iPod Touch into a dryer monitor that is placed on an operating dryer and can send an SMS or email notification to one or designated destinations when the drying cycle is completed. The app uses the iPhone's accelerometer to sense vibrations from the dryer to determine when the cycle is completed. the appliance monitoring methods send a wireless signal to another location or a user device. The signal relays to the user that wash or dry cycle has completed. The signal only alerts users of the completion of a wash or dry cycle, no robust alerts or notifications are given. Unfortunately, users may not like the idea of leaving a phone on a dryer where it could be stolen, and the user may want to use the phone for other reasons but can't do so when the phone must be left atop the dryer.

Many other different systems and methods have been described in the patent literature which provide notification functions for washers and dryers. In Esters, U.S. Pat. No. 4,916,439, a wireless remote device for indicating the status of a washing machine or dryer through the use of a current sensor, vibration sensor, or a sensor integral with the washing machines control is disclosed. In Kuroda, U.S. Pat. No. 5,757,643, a remote management system for a number of washing machines and dryers is disclosed. In Carmichael, Jr., U.S. Pat. No. 5,089,809, means for monitoring the status of a number of appliances is disclosed. In Kim, U.S. Pat. No. 5,285,375, a remote control unit for a washing machine is disclosed. In Adler, U.S. Pat. No. 6,424,252, a paging system for washers and dryers is disclosed.

Other systems and methods for monitoring washing and drying operations involve many electrical components to condition the incoming signals before wirelessly transmitting any type of output. This output is typically capable of only alerting the user that an operation has completed. Additionally, having many electrical components in an apparatus to monitor the washer and dryer may not be aesthetically pleasing. Furthermore, it is a waste of other resources which are readily available in most households. For example, the capabilities and computing power of a smartphone, tablet, or computer which already exist in the household may be used to provide notifications from the raw data extracted from the washer and dryer.

By way of example, U.S. Pat. No. 8,594,969 to Lill discloses a remote appliance monitoring method and system that uses signal conditioning circuitry to concentrate on sinusoidal vibration velocity. A three-axis accelerometer is described. By taking the first derivative of accelerometer output with respect to time Lill describes the accelerometer output as:

$$S_1 = Acc_1 = d(Vib_1)/dt = -2*pi*f_1*B_1*\sin(2*pi*f_1*t); \text{ where}$$

$B_1$=maximum amplitude of $Vib_1$ at frequency $f_1$

The three-axis accelerometer outputs a signal for the x-axis, y-axis, and z-axis. Each output is sent through a rectifier to remove AC ripple for each axis resulting in signals Vibx, Viby, and Vibz. Signals Vibx, Viby, and Vibz move through a low pass filter. A signal combining circuit sums the low pass filter output as:

$$Vibsig = K_1*[(Vibx)+(Viby)+(Vibz)]; \text{ or}$$

$$Vibsig = K_2*\sqrt{(Vibx)^2+(Viby)^2+(Vibz)^2}; \text{ where}$$

$K_1$=constant; and $K_2$=constant

The method and system employs signal conditioning circuitry that uses a comparator to find when the signal exceeds a predetermined amplitude trip point for a predetermined time period. Once the average amplitude falls below the predetermined amplitude trip point, a wireless transmitter sends a signal to a receiver indicative of completion of an operation cycle. The average amplitude may fall below the trip point on washers and dryers that have pauses in the cycle and send false operation cycle signals. This method and system can only be used to detect the end of cycle on a either the washer or the dryer, not both.

Accordingly, there is a need for a system and method for robustly monitoring the operations of both the washer and the dryer, without the cost of unduly burdensome and unnecessary circuitry, which send raw data wirelessly to an application for processing and user notification.

BRIEF SUMMARY OF THE INVENTION

In a principal aspect, the present invention takes the form of methods and apparatus for notifying a user when an event occurs that is accompanied by the production of sounds or vibrations having predetermined characteristics. One or more sensors are employed to convert the sounds or vibrations into sensor output signal which is processed by a signal conditioning circuit which enhances the predetermined characteristics to produce a conditioned signal. The sounds or vibrations are typically produced by the household appliance, but could also be a human voice. A signal recognition unit monitors the conditioned signal to produce a notification alert indication when the conditioned signal satisfies one or more predetermined conditions. In response to the alert indication, a wireless transmitter sends a notification message to one or more notification units that typically take the form of a hand-held device that includes an display, a sound annunciator, a vibrator, or a combination of these which provide an indication perceptible by the user of the existence and nature of the condition indicated by the notification message.

In accordance with a feature of the invention, the predetermined characteristics are manifested by a particular waveshape of said sounds or vibrations and at least one of the predetermined conditions is satisfied when the waveshape of the conditioned signal is similar to a stored waveshape.

The remotely located notification unit may be advantageously implemented by a programmed smartphone or other handheld computer carried by said user and programmed to produce one or more output indications that are perceptible to the user that are indicative of the event recognized.

In one useful embodiment, the household appliance is a washer or dryer and the event to be recognized is the cessation of sounds or vibrations from the washer or dryer indicating that said washer or dryer has completed its operation. In this embodiment, the sensor is an accelerometer that is employed to convert vibrations from said washer or dryer into the sensor output signal.

In another embodiment, a method of notifying a user when a household appliance, such as a washing machine, a dryer, a microwave oven, a stove, an oven, or other device, indicates a condition of potential interest to the user is contemplated which includes the steps of (1) comparing the condition of potential interest to a searchable database of conditions by comparing identification values that represent the condition of potential interest to identification values that are in the searchable database, each of which is associated in the searchable database with status identifying information and notification parameters, the notification parameters specifying conditions related to the determination of whether to issue notifications and how to issue notifications; (2) searching for the location of a user by transmitting a message over a communications network (this network could be Bluetooth, Wi-Fi or other technologies) to the remote device associated with the user; (3) determining a distance between the household appliance and the user, using RSSI, time-of-flight, GPS, IPS, or other methods; (4) using the distance and the notification parameters to sound (this sound could be proportional to the distance and/or to the ambient noise) an alert on the appliance if the distance is within a notification parameter value; and (5) producing an alert notification indication on the remote device when the distance is not within the notification parameter value.

The remote device could be implemented by a programmed smartphone or other handheld computer carried by a user and programmed to produce an output that is perceptible to the user that is indicative of the condition.

Another embodiment contemplates a household appliance that notifies a user when a condition of potential interest occurs. The household appliance includes a special purpose computing processor electrically connected to the household appliance to receive power and signals related to the conditions of potential interest, a memory connected to the computing processor, a speaker connected to the computing processor, a communications transceiver connected to the computing processor, configured to be wirelessly connected to a remote device proximate to a user using Bluetooth, WiFi, cellular or other wireless technologies, where the memory, computing processor speaker, and the communications transceiver physically mounted in the household appliance, and where the computing processor is configured to determine a distance between the household appliance and the remote device, using RSSI, time-of-flight, GPS, IPS, or other techniques. Furthermore, the computing processor looks up notification parameters based on the signals and uses the distance and the notification parameters to activate the speaker if the distance is within a notification parameter value or sends a message to the remote device if the distance is not within the notification parameter value.

These and other objects, features and advantages of the invention will become more apparent by considering the following detailed description. In the course of this description, reference will be made to the attached drawings.

DETAILED DESCRIPTION

Figure 1:
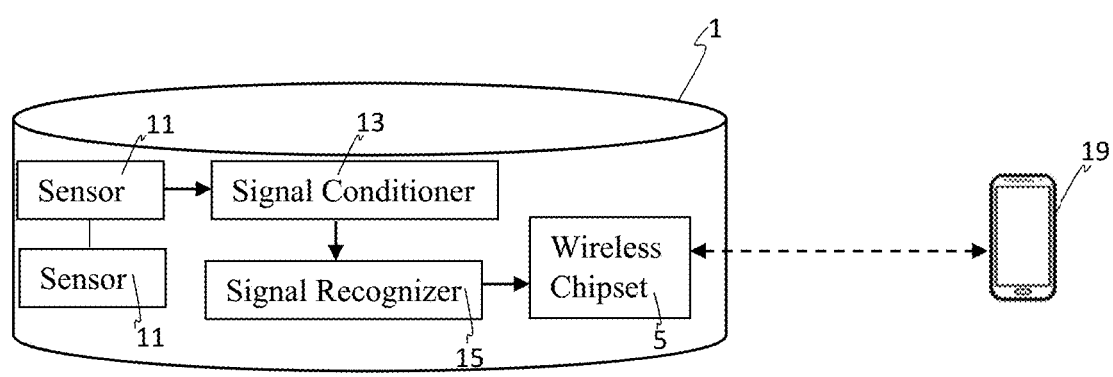
FIG. 1 generally illustrates a triggered signal transmitter 1.

In a first embodiment of the invention, a signal sensing and processing unit here called a "triggered signal transmitter," indicated generally at 1 in FIG. 1, incoming sounds or vibrations from an appliance or device being monitored (not shown) are detected by one more acoustic sensors 11 whose output(s) are connected to a signal conditioner 13 whose output is monitored by a signal recognizer 15. When a predetermined signal is detected by the signal recognizer 15, a wireless notification message is transmitted by means of a wireless chipset 5 to a notification unit 19.

The triggered signal transmitter 1 receives incoming sounds or vibrations and, when those sounds or vibrations meet predetermined conditions, transmits a notification message or messages to one or more users who carry a notification unit 19 or are near to the triggered signal transmitter 1. The triggered signal transmitter 1 includes one or more sound or vibration sensors 11 which may be placed anywhere sounds or vibrations being monitored are to be detected. The sensors 11 may directly connect (electrically, mechanically or acoustically) to appliances and or other objects being monitored to provide greater accuracy. A single sensor 11 may be placed in an area to receive sounds or vibrations emitting from multiple devices that are within its range so that different events of interest may be detected by a single sensor. Alternatively, a plurality of acoustic sensors may be used, some of which are near to or attached to specific devices being monitored. In the following description, the sensor or sensors which detect sounds or vibrations are indicated by the reference numeral 11, although it should be understood that a variety of different sensors such as microphones, accelerometers or other transducers capable of detecting sounds or vibrations and converting these sounds or devices into electrical signals may be employed.

The electrical output signal produced by the acoustic sensor 11 may be conditioned in a variety of ways to make it for more useful for subsequent processing. For example, the signal may be amplified and may be filtered by low-pass, band-pass or high-pass passive or active filters, or a digital filter may perform mathematical operations on a sampled, discrete-time signal from the acoustic sensor to reduce or enhance certain aspects of that signal. In this way, the signal from the sensor may be transformed into a different signal having characteristics that may be more easily monitored to detect predetermined conditions. For example, a band-pass filter may be employed to isolate only sounds of a certain frequency (such as the frequency of an alert tone produced by a washing machine at the end of a washing cycle, or the frequency of the whistle produced by a teapot when its content come to a boil). Other signal conditioning functions that may be applied to the signal received from the acoustic sensor include signal scaling, smoothing, clamping, zero-detection, and peak-detection. The signal conditioner may also produce an output signal whose magnitude is related to the rate of change (derivative) of the input signal, or its integrated value. In the description to follow, these and other signal conditioning functions are performed by a unit generally termed a "signal conditioner" and indicated by the reference numeral 13.

The enhanced signal 14 from the signal conditioner 13 is monitored by a signal recognizer 15 which produces an output signal at 16 when its input signal 14 satisfies predetermined conditions. For example, the signal recognizer 15 may produce an output signal at 16 when the input signal at 14 has an amplitude above or below a predetermined threshold, or lies within a range bounded by upper and lower levels. The conditions to be met may include timing values; for example, the input signal must exceed a predetermined threshold for at least a predetermined time before an output message is produced, or the output message may be programmed to be delivered at the end of a predetermined time delay period after an input signal event is recognized.

As will be discussed in more detail later, the signal recognizer 15 may compare the waveshape, or other characteristics, of the input signal with one or more stored characteristics and produce an output signal when a match occurs. For example, the input signal 14 may be continuously compared with stored waveforms of the kind produced by an oven alarm, the sound a toaster makes when the toast pops up, the whistle of a tea kettle, and the sound a dishwasher stops making when the washing cycle is completed. While plurality of different signal conditioners 13 may be employed, each being adapted to enhance the identifying characteristic of different sounds, sound pattern recognition systems of the kind discussed later in this specification can operate successfully by digitally processing a single signal from an acoustic sensor 11 with little signal conditioning, other than amplification, being required.

In an alternative embodiment, an appliance may be directly connected to the triggered signal transmitter 1 where the appliance sends an electrical signal to the triggered signal transmitter 1 to indicate that an event has occurred. This electrical signal could be in conjunction with an acoustic sensor 11 for detecting other sounds or could be used as the only input.

The signal recognizer 15 determines whether, and when, notification signal should be sent to the user and employs a wireless chipset 5 to handle message transmission. The wireless chipset 5 allows signals to be sent from the triggered signal transmitter 1 to the remote notification unit 19. The wireless chipset 5 implements one of a number of available conventional signaling technologies, such as Bluetooth, cellular, or other short-range wireless signaling scheme, to transmit notification messages to the notification unit 19 which may take the form of a smartphone, a computer or tablet device with built in wireless, cellular or Bluetooth signaling capabilities. The notification unit is typically carried by, or near to, the user, and can produce audible alert signals, display messages, vibratory alerts, or a combination thereof to alert the user to the incoming notification message from the triggered signal transmitter 1.

Figure 2:
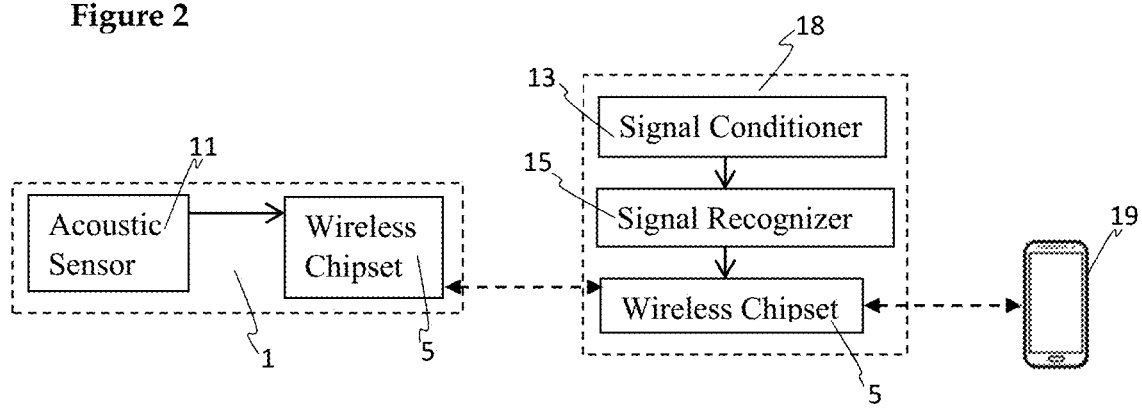
FIG. 2 illustrates the use of a secondary unit 18 that may include a second wireless chipset 5 to transmit notification messages to the notification unit 19.

In an alternative arrangement shown in FIG. 2, the acoustic sensor 11 receives incoming sounds and the wireless chipset 5 relays the incoming sounds to a secondary unit 18. The secondary unit 18 includes the signal conditioner 13 and signal recognizer 15, may include a second wireless chipset 5 that transmits notification messages to the notification unit 19. In the arrangement seen in FIG. 2, a plurality of different sensors, each placed near to or in contact with a different appliance being monitored, sends signals to a shared signal processor at 17 (not shown) with memory 23 (not shown) which performs signal conditioning and signal recognition functions for all of the incoming signals.

Signal Recognizer

The signal recognizer 15 can be preset with templates and patterns for common household sounds that a user would like to be notified of. The signal recognizer 15 can use the signal curves from known sounds to fit and match the incoming sounds to notification messages. Incoming sounds recognized in this manner can be sent directly to the wireless chipset 5 with little need for further processing by the device.

Not all sounds will match a template or pattern. A moving average (also known as a rolling average or running average) can analyze a series of average data points for a given signal and match incoming sounds that do not directly fit the signal curves desired by the user. The data may be analyzed on the triggered signal transmitter, the triggered signal transmitter, or using cloud computing. This type of finite impulse response filter can be modified to pick up fluctuations from incoming sounds from recognizing the incoming sounds trends over longer periods of inactivity. Longer periods of inactivity can include the time when users are asleep or at work. During periods of inactivity the likelihood of an incoming sound triggering a signal to send a notification message is low.

The signal recognizer be adapted to work with multibrand technologies. This is similar to the functionality of a universal remote for televisions. Just as a universal remote allows a user to setup hardware by entering codes into the universal remote. One example of how a universal remote is setup is to press and hold the "setup" button, then press and release the desired mode button (e.g., DVD, TV, Cable), then a code is entered on the universal remote.

The signal recognizer for multibrand technologies may come preprogrammed with sounds from appliances that are found in the marketplace. These preprogrammed sounds can have signal signatures that readily match the target appliance making for easier signal recognition. Examples of some preloaded sounds include boiling water, bubbling spaghetti sauce, and microwave beeps. Other preloaded sounds may come with preloaded delays set for notification messages. Preloaded delays will allow the user to be notified of the completion of a task at the appropriate time. For example, the dishwasher may stop washing the dishes and switch to dry mode as the inside of the dishwasher heats up. When the dishwasher switches to dry mode the dishwasher no longer makes the loud sounds originating from the cycling of water inside the dishwasher. The present invention can detect that the washing cycle has ceased based on the preloaded sounds and will now wait until the preloaded delay has elapsed to send a notification message to the user.

The preloaded delays may appear on the notification unit with a timer to notify the user exactly how much time is left for any given task. The time may count down from the set time in the preloaded delay or count up from the cessation of the task that initiated the delay. Different applications of the preloaded delay can allow the user to more efficiently monitor and interact with articles and appliances around the household.

Secondary Signals

Notifications may require a secondary signal after a trigger signal. After a trigger signal is recognized by a signal recognizer 15, a time period may be set in which a secondary signal must occur in order for a notification to be transmitted. For example, a trigger signal may be an oven timer. A secondary signal may be the sound of an oven door opening. And a time period may be five minutes. In this example the oven timer is the trigger signal that starts a five minute clock. The notification will not be sent unless the sound of the oven door is recognized. If the sound of the oven door it not recognized within the five minute window then a notification will be sent to the user to notify a user of the oven's status.

Notification Table

A notification table may match signals with designated users to be notified upon recognition of a signal. Some signals may notify multiple users. Users may be notified based on their proximity to the environment in which the signal is recognized. In one embodiment, a table matches the sonic alarm emitted by a smoke detector and sends a notification to all users, whereas the acoustic alarm from an oven timer when recognized results in a notification to only the user who is a cook. A notification table may include when notifications are to be suppressed along with parameters and characteristics for suppressing signals. Notification tables may be unique to a specific environment and users proximal the environment. Notification tables may be preset based on an example environment such as a kitchen and the notification units within range.

The notification table may also contain parameters for varying the volume of audio alarms based on the number of people in the room. Or to send an alarm to the notification device if there is no response to a local audio alarm.

In one embodiment, the sounds of setting a timer on a device are detected, and the triggered signal transmitter 1 searches the Bluetooth address domain for users to find who is proximate. When the alarm for that device goes off, only the user who was proximate at the time the alarm was set is notified that the alarm is going off.

User Input Sounds

A user can used the acoustic sensor 11 to capture "control sounds" which are processed by the signal conditioner 13 and then stored (typically after being digitized) in a memory. The signal recognizer 15 is thereafter used to match incoming sounds from the sensor 11 with the stored control sound(s). A database of control sounds can be matched against sensed sounds to produce notification messages when a match occurs. The database may index control sound recordings supplied by device manufacturers, and may record and add new control sounds to the database to monitor any available device that emits sounds or vibrations that should be detected and converted into alarm messages under predetermined conditions.

The database may include status identifying information along with the manufacture and model for each given sound. A single model of dishwasher may sound differently during different operation modes. Since each operation mode has a unique sound, multiple sounds for the single model of dishwasher may be stored in the database. The signal recognizer will differentiate the sounds for the single model of dishwasher by the status identifying information. The user can choose notifications based on the status identifying information. The user can choose the mode of notification and whether to toggle notifications. The user may wish to suppress notifications for specific status identifying information.

A user can add sounds to the database and choose to share the sounds. A user may wish to keep the sounds stored remotely. Shared sounds may be added to the database using an application that connects to a server or the cloud where the sounds are stored. Sounds may be crowd sourced to the database from users who wish to add new sounds to the database. Users may review and rate the sounds added to the database. Sounds may be shared across social media to help advertise the utility of the device, application, and methods described.

A useful method for identifying sounds that match previously recorded sounds is disclosed in U.S. Patent Application Publication 2005/0044561 filed by Russel McDonald and published on Feb. 24, 2005, the disclosure of which is incorporated herein by reference. The McDonald application publication describes a broadcast program receiving and recording device which identifies songs and commercials within the recorded content by searching the content for repeating segments, and bookmarking segments that substantially duplicate other segments as being either songs (if longer than about two minutes) or commercials (if shorter than about two minutes). Repeating duplicate segments are identified by using a Haar wavelet transform to convert recorded sounds into identification values that are placed in a searchable database for comparison with identification values representative of other content. This method may be used to record sounds made by appliances, convert the recorded sounds into identification values that are stored in a database, and thereafter convert incoming sounds from one or more sensors into a stream of identification values that are compared with the database values. When a match is detected, a notification message is sent to the user.

Unknown Signals

A triggered signal transmitter may notify a user if an unknown sound is received. After a signal is received and the signal is processed without a corresponding notification message the user may be notified of the unknown signal and have the chance to categorize and save the unknown signal for future use. For example, a triggered signal transmitter is placed in a kitchen where a new refrigerator has been installed that does not have template signals saved on the database. The refrigerator makes a humming noise that is not identified by the signal recognizer 15. The unidentified humming noise stored for potential use as a control sound, and a notification is sent to a user allowing the user to categorize the humming noise. In this example the user may wish to categorize the humming noise as a maintenance issue with the refrigerator. A user may save this new notification to the current database. Further a user may edit the saved humming noise of the refrigerator after determining a solution for the humming noise. A user may then decide to share the humming noise with a larger database interfaced with the internet or cloud.

Signals Stored with Video

Environments can include a video feed. For instance, a kitchen may have a webcam or surveillance camera. When sounds are recognized by a triggered signal transmitter the video from the same time frame as the sound may be stored. The video and related audio can be stored on the triggered signal transmitter, a notification unit, a tertiary device, or a Multimedia Domain (MMD). If the video feed includes audio then it may not be necessary to store the audio received by the acoustic sensor on the triggered signal transmitter. In one embodiment, a surveillance camera is pointed at the front porch environment of a house. A triggered signal transmitter is placed in the same front porch environment. The triggered signal transmitter may recognize footsteps on the porch. When the triggered signal transmitter recognizes the footsteps on the porch an application may capture the video from the timeframe the footsteps were recognized and save the sound of footsteps with the video feed on the cloud.

Notification Suppression Using RSSI

The radio signal strength indication (RSSI) is used to determine distance from a device to a notification unit (e.g., smart phone, tablet, or computer). If multiple devices are present within a given radio frequency range then notifications may be suppressed so devices in specific ranges receives notifications.

In one example, a household has two users with notification units and a triggered signal transmitter is placed in the kitchen. One user is in the kitchen and the other user is twenty-five feet away in the living room. The timer on the oven goes off and the triggered signal transmitter recognizes the timer from an acoustic sensor. The triggered signal transmitter finds the corresponding notification message from a sound template in a database. Before the notification is sent, the triggered signal transmitter sends out packets to each notification unit for determining relative distance. In this example, if a notification unit receives a packet at a power level greater than a threshold power level, any notifications that would have been sent are suppressed. Since one user is in the kitchen at the time the oven timer goes off, the notification unit on that user receives a packet at a power level greater than the threshold power level. Notifications are suppressed to both the user in the kitchen and the other user in the living room. This notification suppression prevents a user from receiving notifications when the user is proximal the environment where signals are sensed.

In another example, a laboratory has four users with notification units (smart phones) and a triggered signal transmitter is plugged into a power outlet in the laboratory. The triggered signal transmitter sends out packets to each of the four smart phones each time a notification arises to determine which smart phone to send the notification to. In this example, the smart phone that receives the packet with the highest power level (e.g., greatest RSSI) will receive the notification and the other three smart phones will have the notification suppressed. Either the application can compare the power levels from the signal or the device may compare the power levels. The notification unit closest to the device will receive the greatest RSSI. In some cases multiple notification units may receive the same RSSI with this RSSI being the greatest. In these cases notifications may be sent to all notification units with the greatest RSSI.

Walls and other obstacles may skew the power of the signal transmitted by the device. For example, the device may be placed on the second level of a building and the notification units may be located on the first level, second level, and fourth level of the same building. Even though the notification unit on the second level may be closest to the device the notification unit on the fourth level may receive the greatest power indication. Triangulation may be used to solve this issue if enough devices and notification units (or other wireless reference nodes) are present. A localization process can be used to improve the position determination. In one embodiment, the device sends out packets containing RSSI data. The notification units receive the packets. After a packet is successfully received, RSSI is determined. The resulting signal strength measurements from the fixed device are used the notification unit location.

Alarm suppression may be calibrated depending on distance, background noise, and hearing abilities of the intended persons being notified. For example, if a coffee machine produces a quiet chirp indicating that the coffee is ready, use phone notification if the notification unit is ten feet away or further. Another example, if a microwave produces a loud ring, use phone notification if the notification unit is thirty feet away or further. Adjust the notification-required distance based on background noises as measured at the time by the MMD, so that if the user is vacuuming, reduce the distance and increase the volume of the phone alert. Also decrease the distance and increase the volume for the hard of hearing. In an alternate embodiment, the alarm could be delayed in some instances under certain conditions. For instance, if the user is on the phone, a message that the washing machine has completed its cycle could be suppressed, but an alert that a pot is boiling dry on the stove could override the phone call. The delay or override aspect of the alarm may be user configurable, or may be set by default. In other cases, the alarm may be blasted to all remote devices that it knows about. In the case of the pot boiling dry, all devices may be notified because of the risk of fire.

A tertiary device in environments may receive any and all notifications for that environment suppressing notifications from a triggered signal transmitter or to any notification unit. If a tertiary device is present then a triggered signal transmitter proximate the tertiary device will send all notifications to that tertiary device. In one embodiment, a tertiary device is placed in a kitchen to monitor all kitchen activities. In this embodiment a tertiary device may be a kitchen dedicated tablet dedicated. If a tertiary device is detected then notifications to any other device are suppressed. A tertiary device may be a smart appliance that is located in the environment. In addition to sending notification to a tertiary device, notifications may be sent to a MMD.

Alternatively, a conventional programmable device, such as an iPhone or iPad which executes a downloaded application, may carry out all of the functionalities of a triggered signal transmitter. In one embodiment, an iPad is placed at a docking station in a kitchen. A microphone and accelerometer comprise two electrical components in an iPad that are used to sense signals in the kitchen environment. The forward facing and rearward facing cameras may operate as optical sensors for the kitchen environment. The iPad receives environment signals and processes them on an application. The iPad speaker may be used for notification. The iPad Bluetooth or Wi-Fi transmitter can send notifications to other notification units.

Notification Hierarchy

Not all users proximate the triggered signal transmitter may wish to receive notifications. In a household with two adults and two children, the two adults or a single adult may wish to have exclusive control of notifications and actions from the sensing device. Alternatively, notifications may be sent to all users who can connect to the sensing device. The sensing device may operate and only send signals to devices in range. A Bluetooth signal may only reach thirty feet, or a Bluetooth Smart signal may reach up to 200 feet. Alternatively, the sensed signals may be broadcast over Wi-Fi or the Internet to reach users much further from the sensing device. Sensed signals that involve the user safety may desire notifications to be broadcast to a user regardless of range. For example, a user may wish to receive notifications from the sound of a smoke alarm, breaking window glass, or other sounds that may relate to the safety of the user.

Notifications may be sent based on the role of a user or access privileges. Information may be stored regarding access privileges of a user group to transmit notifications. Different notifications may be transmitted to different user groups depending on the access privileges. The device may include an access module configured to store information regarding access privileges for each user group.

In one embodiment of the alarm hierarchy, the notifications could be structured as follows. First, if the unit sensed the person was close by, no phone notification would be necessary. It would merely sound its attention-getting alarm and display information visually on the device itself. The person is determined by detecting a nearby phone when the door is opened (as sensed by the machine itself, or audibly sensed by our add-on device).

Second, if no activity was still sensed (i.e., the door didn't open), the machine could try again, or try harder, that is, by notifying the phone. The machine would jump to this step if the user was thought to be outside of earshot. Third, the person, could dismiss the notification, in the standard, "Notify me later" manner used commonly on the iPhone. Alternatively, the machine itself, working with the phone, might delay the notification if the user was engaged in some more important activity on the phone (such as talking on a phone call). Fourth, the machine could escalate the attempt to connect by sending out an email.

If that did not get the person to resolve the alarm, the machine could further escalate the attempts by reaching out to other "backup" users. That is, other family members who might be available to take action, could be notified if the attempts to reach the first failed. Or multiple users could be notified at the same time in the initial notification attempt. Or maybe the machine knows who is closest and uses that information to delegate the task. Sixth, the notification system could further escalate by using other Internet of Things devices, or cloud-connected speakers to get the attention of the user. That is, if there was an Alexa speaker in another room, the machine could articulate its message ("Hey, your laundry is done"), or simply relay the alarm to that speaker. Seventh, other Internet of Things ("IoT") devices could try to get the attention of the user. Perhaps the message appears on a Smart TV or car display. Or on the display of a stove or refrigerator if either of those devices sensed that the user was nearby or using that IoT device. Such devices could also emit audio in an attempt to relay the alarm (that is, using the same sound), or use a different sound to get the attention the user in attempt to have the message read on the display.

Conceptually, we have a device or machine that can detect the close proximity of a specific user using RSSI, Time-of-Flight, or a positioning system. The machine can be aware of the need of another device to communicate with the user. The device then kicks into gear to get the user's attention and pass the message along. In many respects, the problem being solved here is that the user's phone might not be handy, or that it's an annoyance to keep having to reach for one's phone (in a pocket perhaps) and that merely taking a step or two to a stove to read something is a better way to consume the information.

The idea goes beyond machine-to-machine talk but could be a generalized way to co-opt a machine into being an ad hoc communication tool. By way of example, a user might get a text message from a friend. The stove realizes that the user is standing nearby. It sounds an alert and the user glances over to see the message. Alexa doesn't have to broadcast the information (as an alternative way) and the user doesn't have to fish out a phone. It's a bit like having text messages appear on a Fitbit even though a FitBit can't reply to the text messages. The world is surrounded by displays now, so think of it as a bubble of displays that surround users being hijacked to give visual information in a way that is easier than having to get out and open a phone.

As a refinement to the idea, the notification could be repressed if the presence of another person was detected. That is, in one embodiment, the information would only be presented if it could be done privately.

All of this logic could apply to a stand-alone device as it attempted to reach out to a user. We might not have all the information that the OEM machine would have, but we could listen to see if the door opened.

Speaker on Device

A speaker may be on a notification unit, such as a computer or smartphone, may be employed to notify users by using distinct sounds. Appliances may also have a built in or retrofit speaker used to relay notifications. A speaker on the notification unit may be used to prompt commands to the user. A speaker may be used as an additional alarm. A speaker and an acoustic sensor on the notification unit allow the user to communicate with the device hands-free. Hands-free notification control allows the user to control or respond to notifications while completing tasks.

In one embodiment, the speaker is used to instruct a user on recipes. A user may want to make oatmeal so the user orally commands the triggered signal transmitter to instruct them (with the signal recognizer 15 recognizing the spoken command, to produce an instruction as a notification message). The speaker instructs the user to put the oats, water and salt into the pan. Then the triggered signal transmitter waits for a boiling signal before instructing the user to turn the stove off. Alternatively the triggered signal transmitter may send a notification to the user's phone or wirelessly communicate with the stove to turn the heat off.

Sensing Non-audible and Other Environment Signals

Not all devices and appliances produce sounds and vibrations detectable by sensors or the application. For example, a slow cooker may not produce enough sound or vibration to be detectable. To determine the status of operation for a given device or application where sound or vibration cannot be monitored, the current may be monitored. Current may be monitored by directly plugging the appliance or device into the sensing device. Similarly, the current may be monitored if the sensing device is fit retroactively onto or in the device.

The device can also learn the sounds from the surrounding environment. The signal recognizer can record a sound from the environment and store the recorded sound for later comparison with incoming sounds. The signal processor may record sounds under predetermined conditions (such as: in response to a command from the user, or in response to some other signal which indicates a condition of an appliance to be detected in the future.

A reference error can be established by comparing a predetermined characteristic of an incoming sound and with a stored standard. When the reference error is less than a predetermined threshold, a notification message may be produced. Increasing the threshold allows incoming signals which are less similar to the stored standard to produce a notification message.

The triggered signal transmitter may send additional notification messages if the acoustic sensor continually receives identical incoming sounds. The notification messages frequency and intensity may be increased as additional incoming sounds are recognized. Upon cessation of the identical incoming sound the notification messages can cease. Notifications may come in the form of phone calls, texts, pop-up messages, device vibrations, device tones or the like depending on the nature of the incoming sounds.

If the device sends improper notification messages, or notification messages that the user does not wish to receive, the user may terminate such notification messages from the notification unit 19 so those notification messages will not be output in the future.

The triggered signal transmitter can be powered by an internal, onboard power source, or an external power source. An onboard power source can be permanent and rechargeable. The onboard power source can be replaceable and rechargeable.

Multiple triggered signal transmitters can be placed within an area so that they receive the same sounds, the and the signal transmitters can communicate with each other so that two notification messages for a single associated sound are not sent to the notification unit 19. Multiple devices can measure the amplitude of the incoming sound to determine which device will be responsible for transmission of the notification message to the notification unit 19. The device with the highest amplitude reading for a given incoming sound can send the notification message to the notification unit 19 and signal the other devices picking up the same incoming sound not to send a notification method.

Multiple triggered signal transmitters can be configured to send notification messages to the notification unit 19 regardless and the notification unit may reduce the redundant notification messages to a single notification message. Also, redundant messages can appear on the notification unit 19 with labels from each device identifying which devices sent the notification messages. A user can have multiple devices and areas where similar incoming sounds are received by devices. The labels can identify the device in relation to the notification message. The user can then respond to notification messages by returning to the areas where the devices were placed.

Appliances may sound notifications that are outside of the human hearing frequency. Humans hear frequencies from approximately 20 Hz to 20,000 Hz. The sounding of notifications outside of the frequency a human can hear may allow monitoring of appliances without annoying alarms that may interrupt other household activities, such as, watching television. The acoustic sensor can pick up frequencies outside of those able to be heard by humans and send them to a notification unit 19. The notification unit 19 can notify the user with a sound within the 250 Hz to 4000 Hz frequency band where humans hear well. The notification unit 19 can notify the user with visuals, vibrations, and sounds.

The human ear can hear sounds starting around 20 micro-Pascals. Acoustic sensors can receive amplitudes not noticeable by the human ear. This is helpful for those who are hard at hearing and may not be able to respond to notifications without a personal notification relay device. An elderly person may not hear the oven buzzer but could rely on an acoustic sensor receiving the buzzer sound. The device can take the input from the acoustic sensor 11 and send an output message to the notification unit 19 to notify the user that the oven buzzer rang.

The notification unit 19 can notify the user of the amplitudes at which the acoustic sensor receives a sound. The intensities of sound can be measured in decibels to better place devices around the house. Third party data entailing the output decibels of notifications that any given appliance may produce can be used to optimize the personal household notification relay system. This third party data may be combined with information received by the device to interface with auxiliary systems. A house that has a real-time locating system can interface with the personal household notification system to provide the user with more robust notification messages.

The user can be notified by the notification unit 19 that the toaster oven rang while simultaneously outputting an accurate distance of the device from the toaster oven based on the decibels received by the acoustic sensor in relation to the third party reference values. For example, if the sound intensity reference value for the toaster oven at ten feet is 140 decibels, the device can calculate the distance from the toaster oven by solving for the ratio of the distance difference from the toaster oven. The intensity is proportional to [1/(ratio of distance difference^2)] and the intensity can be solved from dB=[10 log*intensity/(10^−12)]. The device can save the distances of appliances in its memory and use them to optimize pattern and template recognitions of sounds.

Monitoring the volume envelope of sounds received by the acoustic sensor can allow for optimized notification messages. Volume can rise and fall at definitive rates for sounds found throughout the house. A washer may play a musical chime upon completion of its final rinse cycle. This musical chime may rise and fall in a pattern over a fifteen second period. An acoustic sensor can recognize the appliance producing the musical chime based on this pattern. Upon recognition of the musical chime, the notification unit 19 can receive the output message corresponding to the washer producing the musical chime.

Coordinating Appliances

In one embodiment, multiple appliances or alarm relay devices could coordinate the sounding of alarms, presenting the alarm to the user who is interested in the sound and not sounding alarms in other areas. For instance, if the washer completes its cycle, and no one is in the laundry room, the audio alert in that room could be suppressed and the alarm could sound in the kitchen where the user is present. If the alarm relay were integrated with the appliances, the oven could sound the chime that signifies that the washer cycle is complete and display a message on the oven screen stating that the washer cycle is complete. If the alarm relay were a stand-alone, sound activated unit, then the sound could be relayed to a device proximate to the user.

Sound Monitoring

The monitoring of sounds should not be limited to the illustrative washer dryer embodiment described. Sounds from any appliance, device, or process can be monitored using the methods described. An example process that may be monitored is making popcorn in the microwave. A triggered signal transmitter may recognize each popping sound and generate a notification message when the interval between recognized popping sounds rises above a predetermined duration, such as four seconds, generating a notification signal that tells the user to turn off the microwave.

Alternatively the triggered signal transmitter may send a wireless signal turning off the microwave without human intervention. To implement this, signal-responsive turn-off adapter may be plugged into the wall socket, and the microwave plugged into the adapter, so that the adapter can terminate power to the microwave on command from the triggered signal transmitter.

A non-exhaustive list of example sounds that may be monitored include: rattling of bottles in the refrigerator, breaking of glass, chime from an appliance, alarm from a device, the buzzing of lights, ring from a toaster oven, click from a dishwasher, audio notification of the cycle completion of a dishwasher, shifting of ice in an icemaker, doorbell, knock on the door. Monitored sounds may include objects that are not readily accessed by a user, such as a HVAC system or water heater.

Sounds may be monitored to determine whether a device or appliance needs repair or service. Irregularities found from the normal operating sounds may be used to determine whether repair or service is necessary. Operating sounds from the past may be saved and used to compare with current operating sounds.

The triggered signal transmitter's signal recognizer can use data from previously received acoustic signals. Data from naked sounds and sounds processed by the signal conditioner can optimize recognition of recurring sounds. Multiple devices or a single device with multiple acoustic sensors within the same area can take advantage of acoustic arrays to process incoming sounds. Acoustic arrays allow for enhanced rejection of interference signals through spatial filtering. By keeping track of characteristics from surrounding interferences the target sounds can be more easily received and processed by the device. Adaptive filters can improve the effectiveness of the device and ensure the accuracy of the notification messages. In a multiple device configuration, the signal processing could be distributed into each device or each device could forward the sounds to a single device that runs the signal processing software. In one embodiment, small devices could be plugged into the household power plugs in various rooms throughout a house (when plugged into the wall, the device could communicate with other devices wirelessly or through data over power line. In another embodiment, the device could be connected using power over Ethernet). When used with the voice recognition embodiment, request for help or monitoring of the sounds of children could be relayed and in some instances interpreted by the devices. The device could also be used to know who is in which rooms.

Adaptive filters can subtract portions of input sounds that are unrelated to the desired sounds. The adaptive filters can update at a fixed step size parameter using a variety of algorithms. The normalized least mean square algorithm can be used to update the coefficients for the adaptive filter. Coefficients should be updated based on the characteristics from surrounding interference signals and background noise received from the acoustic array.

The signal conditioner can use the acoustic array to detect incident angles for the sounds received by the acoustic sensors. The sounds instantaneous direction of arrival received by the acoustic sensors can be optimized by using expected target directions of arrival to determine relevant events occurring around the device. For example, the device may pick up incident angles ranging from 0 degrees to 180 degrees and the expected target direction of arrival was set to 120 degrees with an error of 5 degrees. This will allow for more robust sound conditioning from incoming sounds between 115 degrees and 125 degrees. Sounds coming from 0 degrees to 115 degrees and 125 degrees to 180 degrees would be suppressed in this example.

The signal conditioner can analyze the dynamic range of received sounds and send that data to the signal recognizer. The signal recognizer can use the dynamic range to determine the appropriate notification messages. As an example, the sound of water spilling out will have a much greater dynamic range then water boiling on the stovetop. Water boiling on the stovetop should have a constant rumble with very little amplitude variation. Conversely, water spilling out of the pan will have varied amplitudes as sounds are generated from the splashing and sizzling of water on the hot stove. The conditioning of the instantaneous direction of arrival allows the device or devices to recognize more nuanced events throughout the house. By analyzing the dynamic range of incoming sounds, the personal household triggered signal transmitter can recognize the appropriate articles and appliances producing the incoming sounds.

Adaptive filters can adaptively track the signal even though the device may be placed or moved around the household. Adaptive filters can adjust their impulse response to filter out sound signals in the environment surrounding the device. For example, the device can filter out the sound of the dryer running so that the sound of water boiling may be more easily received and processed by the device.

An echo and reverberation canceller should be activated in household environments where a high probability of echoes and reverbs exists. Sound source separation and adaptive beamforming processing can cancel directional noises. Directivity patterns can allow the device to filter the signal so only the signal from a desired direction remains for the signal recognizer to process the appropriate notification message. For example, the device may be placed on top of the refrigerator and use directivity patterns that will optimize sounds coming from 3 feet to 4 feet below the top of the refrigerator because many of the desired appliances to monitor will produce sounds in that dimension. Desired appliances in this example can include appliances that are at counter level throughout the kitchen, including the stove and oven.

Sound source separation can further be optimized through scaling and smoothing. The signal conditioner can scale the incoming sound signals to prevent distortion. By changing the magnitude of the amplitudes for a signal in a desired frequency range the signal recognizer can more easily process the incoming sounds. Smoothing will allow for greater sound source separation and can prevent signal loss. Smoothing can provide greater flexibility by allowing a broader range of incoming sounds to be identified by the signal recognizer. Smoothing allows the device to pick up on changes of value that are not quickly recognized by the template and pattern matching techniques employed by the signal recognizer.

The devices and notification units can connect through wireless mesh networking. Mesh networking only requires a single device to be connected to a network for all of the devices and notification units to receive the benefits from the connection. A user may have three devices in his house and one notification unit 19 on his person but the user will only need one of the four devices to be connected for operation of the notification system. Mesh networking can allow the notification unit 19 to keep track of message notifications without an internet connection.

The signal recognizer can detect and classify incoming sounds. The signal recognizer can map the surrounding articles and appliances in the environment over time and send the data to the notification unit. The user can then use the notification unit 19 to track, inventory, and monitor the environment.

The notification unit 19 can provide the user with information indirectly related to the user. For example, the user's roommate may microwave a burrito and forget about the burrito. The triggered signal transmitter 1 can detect when the microwave buzzer has sounded and keep a notification message posted on the notification unit 19 until the acoustic sensor 11 receives the sound of the microwave door shutting. Data sent to the notification unit can be compiled to log the use of articles and appliances throughout the house.

Opportunities for improving efficiencies may be discovered and notification messages can appear to alert the user of the new opportunities. For example, the notification unit may connect to the energy billing data for the house and recognize that the user has been operating the washer and dryer at periods where the cost per kWh is high. Then, the notification unit can alert the user to notify them of periods where they can save money by operating the washer and dryer at periods where the cost per kWh is less.

Child and Elderly Monitoring

A triggered signal transmitter may help monitor latchkey children and elderly persons. A triggered signal transmitter can make sure the upkeep of the living environment for an elderly person is taken care of By monitoring the signals in a living space a log can be created of what tasks are completed at what time. If desired signals are not recognized in a specified time interval then a notification may be sent to a designated notification unit.

One example that applies to monitoring an elderly person is to recognize the sounds from a running dishwasher are heard at least once every four days. If a four day period elapses without recognition that the dishwasher was ran then a notification may be sent to the elderly person's loved one. The loved one can then check on the elderly person. The loved one may call the elderly person and ask them why they have not been running the dishwasher. This may be a sign that the elderly person has been eating unhealthy because they have not cooked and therefore have not needed to run the dishwasher.

One example that applies to monitoring a child is to recognize when chores are complete. A triggered signal transmitter may recognize when a child takes the dishes out of the dishwasher and places them in the cabinets. An application may timestamp when the dishes were unloaded. A triggered signal transmitter may recognize the sound of a vacuum and timestamp when this sound was heard. An application may notify the parent of a child when specific tasks were completed.

In another example, the triggered signal transmitter 1 could be configured to listen for the sound of the opening of kitchen cabinets and notify a parent when they are opened, thus providing additional security from young children getting into areas where chemicals are stored in the kitchen.

In still another embodiment, the triggered signal transmitter 1 could be used in a hospital setting to monitor sounds and alarms, and filter these alarms before forwarding certain alarms to nurses or doctors. Hospitals are notorious for the abundance of alarms, causing alarm fatigue for nurses and doctors. Critical alarms can be lost in the numerous alarms that sound in the hospital. The triggered signal transmitter 1 could be configured to only forward alarms when the doctor or nurse is far enough away from the alarm so that it could not be heard. Further the triggered signal transmitter 1 could be configured to listen to the sounds of the room in which it is located and only forward certain selected sounds/alarms.

In another embodiment, the triggered signal transmitter 1 could be used in a barn or chicken coop to listen for the sounds of distressed animals (or the sounds or predators in the barn), and forward these sounds to the farmer.

Voice Recognition

In another embodiment, the triggered signal transmitter 1 could include voice recognition software capable of determining who is speaking. This could be used to send the user an alert when certain people are heard talking in the location near the triggered signal transmitter 1. Or an alert could be configured to notify the user when an unrecognized voice is heard. In still another embodiment, the words heard by the triggered signal transmitter 1 could be compared to certain words in a dictionary, either as sound prints or the words could be converted into text and compared to a dictionary of words. For instance, the triggered signal transmitter 1 could listen for swear words, and take an action based on hearing someone swear. For instance, if the person swearing is identified, then a list could be tallied, or a quarter could be deducted from the person's bank account as a penalty for swearing.

If voice ID were implemented locally, or available as a cloud service, that could powerfully impact this process. One way would be that microphones might contribute information regarding who was where in the house.

Secondly, a speaker might reply to a request for information if it were the right voice. So if the stove became aware of that text message, it might sound an alert, and the proximate person might say, "What does it say?" If the voice ID matched that speaker to the person receiving the text, the stove could read aloud the text.

Perhaps the machine uses voice commands to allow for command input. In that case, the machine knows who is the user and can use that information later to track down the person to notify.

Voice ID could generically be used by Alexa to condone off information to specific people. For instance, if you asked Alexa how long your commute would be tomorrow, it would recognize your voice and give an answer specific to you.

Backup and Automatic Actions for Notification Unit

The notification unit 19 may not always have the connectivity necessary to communicate with the triggered signal transmitter. Connectivity is important in the present invention, especially when dealing with time sensitive appliances such as the oven. If the user cannot receive the appropriate notification messages, then the food in the oven may burn, or worse, start a fire. Allowing the signal recognizer to output notification messages to a server or other network, a more robust communication network can be established.

A preferred embodiment for the communication network can include a hub that signals the notification unit 19 when the notification unit 19 does not receive a signal from triggered signal transmitter 1. The hub communicates with a server or other network to send a notification call or text to a phone to alert the user. The calls or texts may be routed over a TCP/IP network, Wi-Fi, or a conventional telephone network. The hub includes a selection means for choosing the proper routing method given the devices recognized on the network.

The hub can be an always-on device that receives the incoming signals from the devices placed within range of the hub to relay signals to be processed by the signal conditioner and signal recognizer. The hub can send duplicative signals to the phone or notification unit or can recognize that the phone or notification unit is within range of the devices relaying incoming sounds and cease any duplicative signals.

The backup may be able to perform automatic actions and alert the user that the automatic actions have occurred. Automatic actions are designed to toggle mechanisms and power in appliances to complete tasks for the user. For example, the present invention may determine that the stove has been boiling water for forty minutes. Regardless of whether the user has received notification messages the present invention can turn off the power to the electric stove top, or flip the switch on the gas line to a gas powered stove top. In the case of an electric stove, a wirelessly enabled switch can toggle off the power originating from the 220V power source. In the case of a gas stove, a wirelessly enabled switch can toggle off the gas line connected to the stove top. The wirelessly enabled toggles can use Bluetooth or Wi-Fi to activate the switches and communicate with the notification unit to notify the user that the stove has been turned off. The signal recognizer can determine when the appliances power should be toggled based on the sounds in the environment surrounding the device. The user can input data on the notification unit to toggle the stove to turn back on when they desire the water to boil again.

Power can also be toggled for appliances and articles using a power strip with a wireless toggle function (e.g., Bluetooth). The notification unit can communicate with the power strip to toggle off appliances they wish to cease operation. The signal recognizer can process incoming sounds to the device and determine when a toggle operation should occur. For example, an oven can ring at the end of the baking time for a turkey. The user may have forgot about the turkey in the oven and the device has not yet picked up incoming sounds signifying that the user has opened and closed the oven door to remove the turkey. The signal recognizer can track the elapsed time from when the oven rang and toggle off the power to the oven after a specific elapsed time. The specific elapsed time can be preset in the signal recognizer or a related application on a notification unit. A specific elapsed time may not have been set for incoming sounds and the signal recognizer or a related application may determine that the oven power should be toggled off for safety precautions.

The device can take the incoming sounds and elapsed time from specific incoming sounds to create built-in safety precautions. The safety precautions can vary depending on the specific recognition of the incoming sounds that the device receives. A device that receives incoming sounds from many appliances that have the potential to overheat or burn food items placed within them may toggle off appliances and power strips at preset times to prevent safety hazards. The device and or application may automatically toggle off appliances and power strips at times when no one is in the environment. For example, the device and or application can toggle off appliances from 10:00 pm to 6:00 am because people may be asleep or not using the appliances during these times.

The application can interface with GPS capabilities to determine when the user is out of the building in which the device receives incoming sounds. The application can toggle off the power on appliances automatically when the user is out of the building. Similarly, Bluetooth can calculate the range of the user from the device and toggle devices on and off depending on the magnitude of the range. The device and application may be sold as a part of an OEM package to be used as the hardware and software.

Device and Appliance Toggle

The application can toggle appliances on and off manually by user inputs to the application or at preset times determined by the user. For example, if a user has work until 7:00 pm but had a dinner party planned at 7:30 pm the user can place a pot of water on the stove and preset the stove to turn on via the application at 7:10 pm. This way the user can arrive home at 7:20 pm to boiling water and be able to cook artichokes in time for the dinner party. The device and application can be used to monitor the water from 7:10 pm to 7:20 pm and adjust the power level to the stove to prevent possible boil overs.

An auxiliary device can be plugged directly into the stove to change the draws of the current the stove receives from the 220V power outlet. A SPST toggle switch can toggle off and on power from the power strip or power source in parallel circuitry configurations. A SPDT and DPDT toggle switch can be employed to toggle the power for different appliances connected in serial circuitry configurations. Electromechanical devices may be employed to toggle power and functionalities of appliances. For example, a relay or a high power transistor could be used to switch the power. The application can determine which switches to toggle and when based on user input, preset input, and from the incoming sound from the environment. The signal recognizer can match templates or sound signatures to sounds occurring in the environment to trigger a power toggle.

IR Sensor

The device can include an infrared (IR) sensor to improve and add to the sensing abilities of the acoustic sensor already found within the device. For example, if the device includes an IR sensor and is positioned by the stove, the IR sensor can signal the device and notification unit to provide the user with a notification message the stove is on or off. The IR sensor can also determine the exact heat, and display the exact heat on the notification unit or phone of the user from the region the IR sensor is positioned to measure. An IR sensor may sense the heat from a safety hazard such as an appliance running at an unusually high temperature or a fire.

Light Sensor

The device may further include a light sensor to determine if a device or appliance is nearby. The light sensor may sense the ambient light around the device. The ambient light sensor may sense when indicator lights on appliances and devices are illuminated. Depending on the existence or intensity of the illumination notifications may be transmitted to the user such as the operating status. In lowlight environments, indicator lights may appear very bright if the luminance of the lights are not adjusting based on the ambient light in the room. Thus the position of a light sensor on the device is important. Further a light sensor may be calibrated depending on the environment. A light sensor may detect if lights are on in an environment or if there is smoke from a fire. For example, a triggered signal transmitter 1 may couple with a photodiode to determine if lights are on in a kitchen.

Smell Sensor

Alternatively, a smell sensor could be used to detect other conditions in the kitchen. For instance, the smell sensor could detect the smell of burning food or determine through smell when the apple pie was read to take from the oven. The smell sensor would be incorporated in the triggered signal transmitter 1 as one on the sensors 11.

Washer Dryer Alarm (WDA)

The principles of the present invention may be used to advantage to implement a WDA. A WDA seen in FIG. 5 configured to the washer and dryer, and detects and communicates the status of each. A WDA 4 may be connected directly to the washer 10 or dryer 8. Or a WDA 4 may be coupled to an intermediary 6 connecting the washer and dryer. A WDA 4 allows the user to monitor the washer and dryer without having to physically move to the area where the appliance is located thus saving the user time and avoiding the effort needed to monitor the status of each machine. When used with a stacked washer 10 and dryer 8 as seen in FIG. 6, a WDA 4 may be attached to either. A WDA 4 may transmit notification messages to a smartphone 12 or to a remote computer 14 as seen in FIG. 6.

Vibration Through an Intermediary

Figure 5:
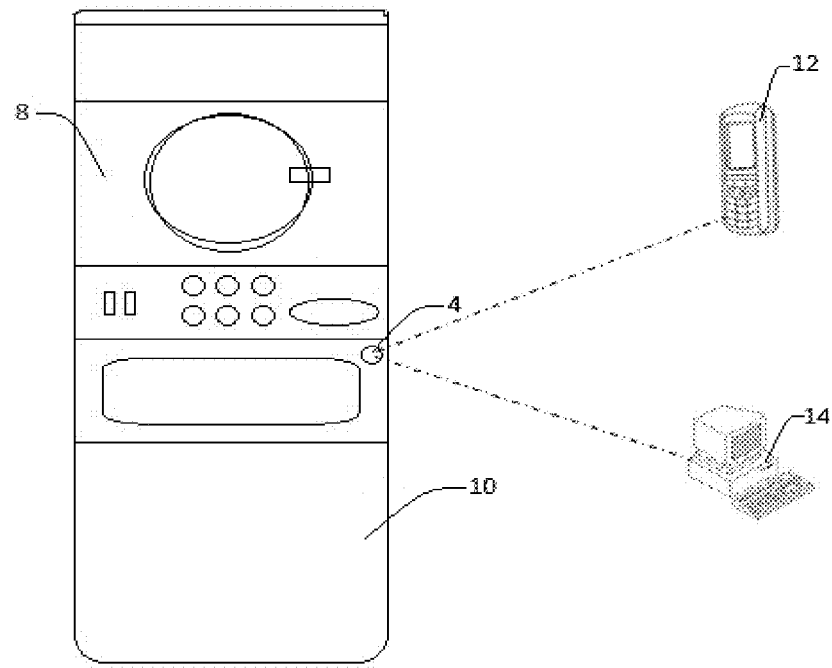
FIG. 5 illustrates a WDA 4 communicating with a device.
Figure 6:
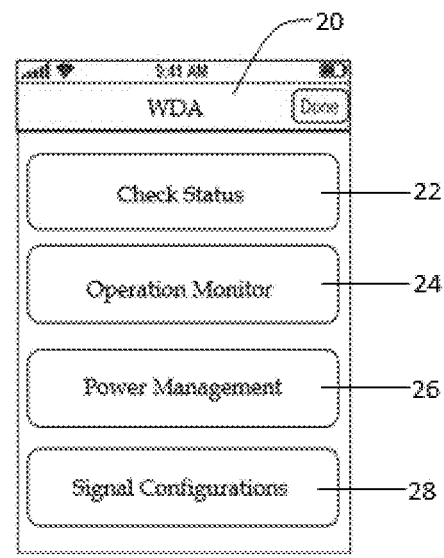
FIG. 6 illustrates an example GUI of the application.

An intermediary 6 seen in FIG. 5 configures to the washer and dryer so that vibrations may be felt from each of the appliances. An intermediary should not be composed of a vibration damping material for best results. Various metals, polymers, and composites can be used as an intermediary between the washer and the dryer. An accelerometer is configured to the intermediary to detect vibrations from the washer and the dryer. An intermediary attaches to at least one point on the washer and another point on the dryer. An intermediary may attach using screws, brackets, latches, adhesives, bolts, and the like. As the washer and dryer operate they vibrate causing the intermediary to vibrate in turn. The vibrations from the intermediary are detected by the accelerometer.

Detecting Vibrations without an Intermediary

A WDA may not employ an intermediary at sense vibration and acoustic signals. Sometimes washer and dryers are already connected to each other. They may be connected to each other by being stacked so that either the washer or dryer is above the other as seen in FIG. 6. An accelerometer can pick up the vibrations from both the washer and dryer when the appliances are connected in such a manner.

Even if the washer and dryer are not connected, an accelerometer may be able to pick up vibrations from the appliance that is not connected. For example, the accelerometer may be placed atop the washer but still detect vibrations from the dryer that is three feet away depending the vibration-damping abilities of the floor.

Type of Accelerometer

Although a single-axis accelerometer may be used to determine the status of the washer and dryer, a three-axis accelerometer may be better suited to measure vibration because of the additional axis. By summing the signal from each axis the vibration from the washer and dryer may be better mapped.

A DC-response accelerometer may be employed to measure acceleration from the washer and dryer. The accelerometer may employ a Micro-Electro-Mechanical Systems. A capacitive accelerometer may be used for monitoring the status of the washer and dryer because capacitive accelerometers are ideal for measuring when the g level is low. Additionally, capacitive accelerometers allow for good linearity and high output stability. The DC-response accelerometer may be of the piezoresistive type. A piezoresistive accelerometer uses changes in resistance from strain gages.

Alternatively, an AC-response accelerometer using a piezoelectric element may be employed to measure the acceleration from the washer and dryer. Acceleration from the washer and dryer causes the piezoelectric element to produce an electrical output based on the displacement of the piezoelectric element. The electrical output may be charge based or voltage based.

The accelerometer employed by the WDA 4 may use a dampener to reduce or prevent resonance. Preventing resonance in the accelerometer can allow the vibration signal from the washer and dryer to be preserved and clearly processed. If the accelerometer is attached to an intermediary then the intermediary may act as a natural dampener to aid in allowing the accelerometer to receive a clear signal from the washer and dryer.

Analog signals from an accelerometer pass through an analog-to-digital converter. The analog-to-digital converter will measure the range or frequencies produced by the washer and dryer. The analog-to-digital converter should have an effective number of bits equal to its resolution. The output signal of the accelerometer should be matched to the bandwidth and signal to noise ratio of the analog-to-digital converter to minimize errors in the dynamic range.

Sending the Digital Signal from the Transmitter

The transmitter for the WDA 4 relays the signal from the accelerometer 40 and the acoustic sensor 11 to the receiver. The WDA may employ at Bluetooth chip to send a low energy data transmission via the Bluetooth Low Energy Standard. The Bluetooth Low Energy Standard allows for communications between devices based on events. Two or more devices must synchronize to a schedule of events when establishing a low energy connection. For example, the WDA and a smart phone can synchronize to transmit data whenever the washer or dryer provides vibrations to the accelerometer configured to the WDA. The WDA can also use the Bluetooth Classic standard as described in version 4.0 of the Bluetooth Specification from the Bluetooth Special Interest Group (SIG). SIG has identified the smart home market as an advantageous market for using the low energy technology because of the low power requirements, compatibility of smart devices, and the small size. The low cost is also a factor.

A WDA may also use the local network, mesh network, or Wi-Fi to send data from the accelerometer to another device. Data sent from the WDA may be limited to time intervals when the accelerometer is sensing force above a threshold. Preventing the WDA from sending needless data from time intervals when the accelerometer is not detecting adequate force that can reflect on the statuses of the appliances can conserve the power of the WDA.

A WDA can connect through wireless mesh networking. Mesh networking only requires a single device to be connected to a network for all of the devices to receive the benefits from the connection. Mesh networking can allow the notification unit to keep track of message notifications without an internet connection.

Processing the Digital Signal

The acoustic sensor receives incoming sounds used to relay notifications to the user based on correlations to the parameters created for specified notification messages. The user could be notified by sending a message to a mobile device such as a laptop, cell phone, tablet, watch, or similar device. The correlation of the detected vibrations could be processed by a WDA 4 (which may be implemented in whole or in part by a suitable application program (app) executing on a smartphone or the like). A WDA 4 may be placed anywhere sounds may be received from the washer and dryer. The device may couple directly to the washer and dryer to provide greater accuracy.

The range of the frequency may be applied to specific applications so that data may only be processed by the applications if the digital signal is within the specified range. When the corresponding digital signal falls within the parameters the applications will process the data. A band-pass filter may aid to optimize the digital signal. The digital signal may pass through a rectifier and a comparator to accomplish this result.

Digital signal filtering functions can be performed by a programmed smartphone or the like which acts as a signal conditioner and/or signal recognizer. Preset parameters for signals will be used to output messages from the device based on the processed digital signal.

The electrical signals output from an accelerometer and/or acoustic sensor 11 can be sampled or run continuously. The signal conditioner in the WDA advantageously contain specific signal conditioning circuits to remove as much noise and error from the signal as possible. The bandwidth, or frequency of the signal, must be limited to a range to fit the vibrations and sounds produced by the washer and dryer. If an analog sampled signal is output by the accelerometer 40 or acoustic sensor 11 then an anti-aliasing filter must be used. The anti-aliasing filter is essential to satisfy the Nyquist-Shannon Sampling Theorem to ensure the sampling rate is at least twice the overall bandwidth of the original signal. This is a key for effective signal processing in the digital domain for signal recognition. Although sampling at a higher rate allows for better database 46 signal matching, higher sampling rates increases power consumption and memory required by the WDA 4.

Accuracy when processing the signal is important for sending the proper notification message to the user. Fourier transform can be used to recognize the status of the washer and the dryer simultaneously. Template matching the signal may allow for quick processing of the signal before desired notification messages notify the user of the status of the washer and dryer.

The application can be preset with templates and patterns for common washer and dryer vibrations and sounds that a user would like to be notified of. The application can use the signal curves from known vibrations and sounds to fit and match the incoming vibrations and sounds to notification messages. Not all sounds will match a template or pattern. A moving average (also known as a rolling average or running average) can analyze a series of average data points for a given signal and match incoming vibrations and sounds that do not directly fit the signal curves desired by the user. This type of finite impulse response filter can be modified to pick up fluctuations from incoming vibrations and sounds because of its utility in recognizing the trends from incoming sounds over longer periods of inactivity. Longer periods of inactivity can include the time when users are asleep and likelihood of an incoming vibration and sound triggering a signal to send a notification message is low.

The application can store the vibrations and sounds from the surrounding environment. The application can duplicate a vibration or sound from the environment and program said vibration or sound onto the device. The device can use vibration and sound descriptors and other data indicating targeted training signal waveforms identified by the application. Targeted training signal waveforms corresponding to vibrations and sounds from the environment that the user may desire notification messages from contain predicted signal signatures. Predicted signal signatures can rely on phase curves from incoming sounds and those of targeted training signal waveforms to learn sounds from the environment.

A reference error can be established from the incoming signals phase curve with the phase curve of the targeted training signal waveform. The reference error can be set to program signals from the environment that corresponds to the targeted training signal waveform within the reference error. Increasing the reference error associated with a targeted training signal waveform can account for phase fluctuations within the environment.

A WDA can be powered by an internal, onboard power source, or an external power source. An onboard power source can be permanent and rechargeable. The onboard power source can be replaceable and rechargeable.

The human ear can hear sounds starting around 20 micro-Pascals. Acoustic sensors can receive amplitudes not noticeable by the human ear. This is helpful for those who are hard at hearing and may not be able to respond to notifications without a personal notification relay device.

An elderly person may not hear the washer buzzer but could rely on an acoustic sensor receiving the buzzer sound. The device can take the input from the acoustic sensor and send an output message using the application to notify the user that the washer buzzer rang.

A washer may play a musical chime upon completion of its final rinse cycle. This musical chime may rise and fall in a pattern over a fifteen second period. An acoustic sensor coupled with the application can recognize the appliance producing the musical chime based on this pattern. Upon recognition of the musical chime, a notification message corresponding to the washer producing the musical chime can be sent.

The application can analyze the dynamic range of received signals to determine the appropriate notification messages. For example, the washer cycle signal may have a greater dynamic range than the dryer cycle signal. By analyzing the dynamic range of incoming signals, the correct notification can detail the appropriate appliance producing the incoming signals.

An echo and reverberation canceller should be activated in household environments where a high probability of echoes and reverbs exists. Sound source separation and adaptive beamforming processing can cancel directional noises. Directivity patterns can allow the device to filter the signal so only the signal from a desired direction remains for the signal recognizer to process the appropriate notification message.

Signal source separation can further be optimized through scaling and smoothing. The application can scale the incoming signals to prevent distortion. By changing the magnitude of the amplitudes for a signal in a desired frequency range the signal recognizer can more easily process the incoming signals. Smoothing will allow for greater signal source separation and can prevent signal loss. Smoothing can provide greater flexibility by allowing a broader range of incoming signals to be identified by the application. Smoothing allows the device to pick up on changes of value that are not quickly recognized by the template and pattern matching techniques employed by the application.

Cycle Notification

The device may send additional notification messages if the accelerometer and acoustic sensor continually receive identical vibrations and sounds. The notification messages frequency and intensity may be increased an incoming signals continues to be received. Upon cessation of the identical incoming sound the notification messages can cease. Notifications may come in the form of phone calls, texts, pop-up messages, device vibrations, device tones or the like depending on the nature of the incoming sounds.

Sending notifications of the estimated time to completion of wash and dry cycles is a primary function of a WDA. A WDA can monitor and send notifications from the washer and dryer at the same time. Notifications of the current status of the washer and dryer are helpful so that the user can decide when to tend to the washer and dryer. For example, the user may be notified that the washer has completed its cycle but the dryer has ten more minutes before completion. The user may wish to wait the ten minutes for the dryer to finish its cycle before tending the washer and dryer.

End of Cycle Reminders

Once a WDA has detected the end of the cycle, in one embodiment, the WDA could periodically notify the user that the cycle has ended until the door of the machine has been opened. The opening of the machine could be detected by identifying the vibration signature of the opening and closing of the door of the appliance. Once the WDA has determined that the door was opened, it could then cease notifying the user that the cycle is complete.

Maintenance and Operation Notifications

A WDA may also process data to analyze and determine if maintenance needs to be done on the washer and dryer. Irregular sounds in the cycles may notify the user that service is recommended for the washer and dryer. A WDA can also detect operational issues. For example, the washer and dryer may have unintended objects clunking around during a cycle which may damage the washer and dryer or the object itself. By sending a notification that an unintended object is cycling in the washer and dryer the user can choose to remove the unintended objects. This may be helpful for unintended objects that could slip into spaces inside the washer and dryer and damage the appliances. Unintended objects can produce sounds and vibrations at a given signal amplitude. Unintended objects may make similar sounds and vibrations as the washer and dryer operate. As the washer and dryer operate the sounds and vibrations will continue to be sensed by the WDA. The unintended objects may not make sounds and vibrations at regular time intervals but the amplitude of the sounds and vibrations will continue to be relatively similar to the object originating the sounds and vibrations.

The vibrations and sounds sensed by a WDA will transmit digital signals to an application. An application can detect unintended objects by comparing the signature digital signals from previous operations to the digital signal from the operation with the unintended objects. For example, an application will store the signature digital signal from previous regular wash cycles and pick out the larger amplitudes created by the unintended object. An application will have a threshold level of amplitude that can be set by the user. Once the threshold level of amplitude is reached and repeated multiple times a notification message will alert the user of the irregularity in the wash cycle. The number of amplitudes created by the unintended object, or occurrence rate, necessary for a message can be set by the user. Changing the amplitude magnitude and occurrence rate acts as a sensitivity control for detecting irregularities in the washer and dryer operations.

A WDA can also detect unbalanced washer loads and send notifications to the user of the problem. The digital signal for an unbalanced load will lag and lead in discrete time intervals from its signature digital signal. When clothing is placed unevenly in a washer and dryer the operations of the appliance may not properly operate. The clothes may dry and wash unevenly. Further, unbalanced loads may cause harm to the appliances. By notifying the user of the unbalanced load the user can immediately fix the load and more carefully load the appliance in the future.

Maintenance and operation notifications are sensed from other environments based on irregular characteristics. A fork may fall to the bottom of a dishwasher causing an irregular noise. A signal recognizer may notice a clunking noise from the fork and send a notification to a user to tend to the dishwasher. An air conditioning unit may be buzzing due to a loose fan. A signal recognizer may notice the buzzing and notify a user to tighten the fan. Common irregular characteristics similar to the fork and air conditioning examples may be readily recognized by a triggered signal transmitter and/or an application. Once irregular characteristics are recognized a notification message can be sent to a user regarding maintenance and operation.

WDA Pairing with Appliances

A WDA may use Bluetooth to pair with appliance found in the house. By pairing with devices in the house a WDA can not only communicate directly with the appliances, a WDA can manage power consumption more effectively. For example, if a WDA is paired with a washer and dryer the WDA can toggle the power to the transmitter on and off as the washer and dryer are powered on and off. The WDA can use the accelerometer to detect the presence of washer and dryer cycle.

Proximity Notification Toggle

A user may not wish to have notifications sent to them when they are close to the washer and dryer because they may be redundant, inefficient, and annoying. The WDA may not send notifications to the user when they are within a set proximity to the washer and dryer. The WDA can detect devices that run the application within a set range from the washer and dryer. These devices will not receive notifications of operations because the devices are close enough to the washer and dryer that the user could readily monitor and tend to the washer and dryer.

A WDA can discern proximity of a paired object by monitoring the Bluetooth signal strength from the object. Measuring the proximity of an object via signal strength does not find the proximity of a person when that person moves away from the object, or sets the object down. Time-of-flight or GPS (or IPS) may be used to discern the proximity of paired objects.

Thus, an improved embodiment allows the Bluetooth to read the output of the accelerometer in the paired object. If the output of the accelerometer is indicative of a person moving away from the washer and dryer then notification messages will be sent to reflect the status of the washer and dryer. If the output of the accelerometer is indicative of a person not moving, or remaining in close proximity to the washer and dryer, then the notification message will toggle off.

Bluetooth Detection

Many electronics are destroyed inadvertently by being sent through the wash. From music players to smart phones, people forget to empty the pockets of clothes before running a load of laundry. The washer or dryer can automatically shut off or prevent the washer or dryer from running when a Bluetooth chip is detected within the washer or dryer. A Bluetooth sensor may send an alert that a Bluetooth chip is detected within the washer or dryer. A Class 3 Bluetooth sensor has a range of up to three feet and should be employed for close range Bluetooth detection. Many electronics use Class 2 Bluetooth devices using 2.5 mW of power which have a range of about thirty feet. The WDA can create an electronic leash with all Bluetooth devices in proximity. The WDA can use the proximity profile of Bluetooth devices to detect an approximate range. Proximity may be estimated using the RSSI value of the radio receiver.

The WDA can use the Bluetooth sensor to prevent Bluetooth enabled devices from inadvertently being washed.

A Bluetooth sensor searches for Bluetooth enabled devices that are within range of the washer and dryer. The Bluetooth sensor does not need to pair with Bluetooth enabled devices but will detect which devices are in range. Not all Bluetooth enabled devices that are detected will prevent the washer or dryer from running or trigger an alert. Some Bluetooth enabled devices will be ignored by the sensor. For example, the washer and dryer may be Bluetooth enabled and send a signal or clothing embedded with washable Bluetooth sensors may send a signal but these signals may be ignored because they will not be destroyed by running the washer or dryer.

A WDA will determine whether to notify the user that a Bluetooth enabled device is within range through database recognition in an application. Bluetooth sensors that are protected from washer and dryer operations or approved for washers and dryers will be contained in the database interfacing with an application. An application will not notify the user of Bluetooth sensors that are in the database.

A Bluetooth sensor may detect Bluetooth signals within a short range. If Bluetooth signals are detected within this short range an alert may be sent to the user or the washer or dryer may be prevented from running. More exact distance location of Bluetooth signals may be employed to determine if a Bluetooth device was inadvertently left in the washer or dryer. For example, the trip time for the Bluetooth signal may be measured and using the known velocity of the signal a distance can be derived. If found distance falls within the parameters from washer or dryer alerts or shut offs then an alert and or shut off will occur. Alternatively, the distance to the Bluetooth chip may be measured from the power drop of the signal and knowing the source of power. The larger the power drop, the further the distance.

A Bluetooth sensor may be placed inside the washer and dryer to detect Bluetooth signals when the washer or dryer is closed. Some Bluetooth signals may not be detected by outside Bluetooth sensors when placed inside of the washer or dryer because of the surrounding materials of the washer and dryer that effectively block the Bluetooth signal. If the Bluetooth sensor is placed inside the washer and dryer then the Bluetooth signals inside of the washer and dryer can be detected. If the Bluetooth sensor inside of the washer and dryer picks up any signals then an alert should be sent and the washer or dryer should be prevented from running.

Multiple Bluetooth signals may be detected by the Bluetooth sensor. For example, a first signal may be detected from an iPod and a second signal may be detected from a smart phone. The washer and dryer may be paired with the smart phone because the phone is connected to the appliances in the house to control and track the appliances. The Bluetooth sensor receives accelerometer readings from the smart phone to ensure that the smart phone was being moved by the user. Then the Bluetooth sensor could ignore the signal from the smart phone. If the smart phone was outputting no accelerometer movement then the Bluetooth sensor could send an alert to the user and prevent the washer or dryer from running a cycle.

Alternatively, a smart phone placed in the washer and dryer will detect accelerometer readings as soon as a cycle commences. The accelerometer readings that correlate to the rotational movement of the washer and dryer can alert an application to notify the user to stop the washer and dryer. The WDA may also directly communicate with the washer and dryer to immediately stop operation when the accelerometer detects the rotational movement. The WDA application on the smart phone can transmit a wireless signal via Bluetooth to the washer and dryer to end operation. An application can send texts, email, and phone call alerts to notify the user that the smart phone is inside the washer and dryer.

An application will not send a notification if the accelerometer is detecting movements characteristic of being inside the pocket of someone who is walking around. Many times a user will keep their smart phone in a pants pocket when loading the washer and dryer. The accelerometer of that smart phone will pick up a reading each time the user steps. The reading will have greater amplitude when the user steps with the foot on the side of the body where the smart phone is located. When the user steps with the foot on the side of the body that the smart phone is not located the amplitude will be lower. Further, the time interval between amplitudes will vary greater than if the smart phone was left inside a washer and dryer where a cycle is running. The cycles are not as irregular as a person's movements inside a house, therefore an application can determine if the smart phone is in a pocket or inside an appliance by the length of the time interval between peaks and the differences in amplitudes from peak to peak.

Multiple Bluetooth Signals

A Bluetooth sensor may be programmed to ignore Bluetooth signals from devices that are known to either be washer and dryer safe or preset as a device that will not trigger an alarm or prevent the washer and dryer from running. The Bluetooth sensor can still detect the signals from these devices but can immediately dismiss them once they are detected.

A Bluetooth sensor may also have a set number of Bluetooth devices that it senses. Once the number of Bluetooth devices increases to an amount above the preset number an alert may be sent to the user or the washer and dryer may be prevented from operating. For example, the Bluetooth sensor may be set to sense only two Bluetooth devices. If a third Bluetooth device enters the proximity of the Bluetooth sensor an alert may be sent and the washer and dryer could be prevented from operating. The set number of Bluetooth devices may be calibrated by allowing the sensor to detect Bluetooth devices in range when no extra devices are around. The set number of Bluetooth devices may be manually entered into an application or control that communicates with the Bluetooth sensor.

WDA Application

The notification unit, when implemented by an app executing on a smartphone or the like, generates notification messages in accordance with user settings and data received from the WDA 4. The WDA 4 transmits an electrical signal to a notification unit. The signal is then processed by the application on the device. Parameters for notification messages are set by the user in the application that processes the notification signal from the WDA.

A WDA determines the status of washer and dryer operation. The application transforms the sensor signals from the accelerometer into a time-frequency data representation. Background noise is estimated and a signal detector isolates periods containing signal. Periods without signal content are included in the noise estimate. The time-frequency representation of the input signal is rescaled and compared to time-frequency representations for a number of templates defining a signal model, where each signal model represents a washer and dryer operation. The average distortion between the measured time-frequency representation and the time-frequency representations of each signal model is calculated. The signal model with the lowest distortion is selected. If the average distortion of the selected signal model is sufficiently low, the source is declared to belong to the corresponding operation. If not, the source is declared to be of unknown type.

The set of signal models is trained with signal data by creating templates from the time-frequency representation of the input signals when such time-frequency representations are significantly different from the time-frequency representations of existing templates. If an existing template is found that resembles the input signal time-frequency representation, that template is averaged with the input signal time-frequency representation in such a way that the resulting template is the average of all the data that matched that template in the past. The WDA application stores the data from incoming signal to provide more accurate results in the future. The WDA may determine the washer and dryer operation when some portions of the incoming signal are masked by noise.

The digital signal is processed in accordance with the parameters to detect the frequency of the acoustics and vibrations of the washer and dryer. The WDA may send a digital signal for the vibrations of the washer and dryer and another signal for the acoustics of the washer and dryer. The WDA may send both the vibration and the acoustic data in a single digital signal. Either way an application will analyze the frequencies of the digital signals. Frequencies will vary depending on the operations of the washer and dryer. The varying frequencies can be used to track the status of the washer and dryer simultaneously.

The aggregate voltage from the digital signal provided for by the accelerometer can help distinguish operations of the washer and dryer. The WDA application can use signature voltages to determine what operation is taking place with the washer and dryer. The signature voltages are used to determine the estimated time left in a cycle as well. Drops and rises in voltage over specified time intervals can match digital signal templates that accurately notify the user of the remaining operation time.

The order of sounds or vibrations can be calculated by the application 20 from the digital signal sent by the WDA so the acoustic pressure level corresponding to the calculated order can determine which appliances are running and at what cycle they are running. Differences in the acoustic pressure level are correlated to operations of the washer and dryer. The application 20 may distinguish the washer from the dryer by determining if the sound pressure level is high or low. The sound pressure level may be expressed as follows:

$$\text{Sound Pressure Level (dB)} = 20\log\left(\frac{p}{p_{ref}}\right)$$

The effective sound pressure is p, and the reference sound pressure is $p_{ref}$. The common $p_{ref}$ value is 0.0002 dynes/cm' because that's approximately the threshold of human hearing but the WDA 4 may be configured with a lower $p_{ref}$ to adjust the sound pressure level. The source of generation of abnormal sounds and vibrations can be reliably identified by measuring the difference in sound pressure levels. The WDA application 20 should filter out sources of generation that do not conform to the sounds pressure levels of the washer and dryer operations. Sound pressure level will vary depending on the current operation or operations of the washer and dryer. For example, a washing machine can have different sound pressure levels for the washing cycle, a rinsing cycle, a dewatering cycle, and the like.

The frequency domain representation of incoming signals provides a convenient format for extracting perceptually important signal features. Important features for characterizing the signals include spectral flux, spectral centroid, and spectral peaks. Common signal processing operations in the frequency domain representation divide the signals into overlapping frames, window the signals, and manipulate the signals through Fourier transformation. These processes can classify what type of washer and dryer operation is occurring.

There are a finite number of washer and dryer makes and models. The WDA application 20 employs signature vibration signal recognition and signature acoustic signal recognition to determine the status of the washer and dryer. Database 46 is coupled to communicate directly with the WDA Application 20. The database 46 can be included with the WDA application 20 or the database 46 may be referenced from the internet. The WDA application 20 may use a plurality of databases of vibration and acoustic signatures to compare a received vibration and acoustic signature against during operation of the washer and dryer. For example, the acoustic sensors may detect the sound pressure level then aid an application in selecting the correct database to compare the vibration levels with. Further, the user can select their make and model of washer and dryer from the WDA application. The WDA application will then carefully track the incoming digital signal from the WDA to determine the estimated time left for the operation to complete.

An application may be used to process signals sensed in environments where different appliances and devices exist besides those used with the washer and dryer. A kitchen is a common environment where an application may process signals. An application may process signals sensed from an oven, refrigerator, stove, microwave, cookware, etc. An application may process signals from laboratory environment where devices may need to be monitored while lab technicians are away. An application may process verbal signals from humans in a room in order to change the surrounding environment conditions (e.g., temperature, lighting, volume).

WDA Application GUI

A WDA application will allow the user to monitor the amount of wash time and dry time left for the washer and dryer. The WDA application GUI will allow maintenance data, operation history, and unintended object alerts to direct the user to potential problems with their washer and dryer. The WDA application GUI can allow the user to share the data collected from WDA. The WDA application can interface with the internet to synchronize and compare incoming digital signals with existing digital signals. The user can view makes and models of washers using the WDA application as it interfaces with the internet to pick the make and model they are using. By choosing the make and model of the washer and dryer monitored by the WDA, the proper signature digital signals can be used to process the digital signal in an application.

Detailed Description of the Drawings

FIG. 1 generally illustrates a triggered signal transmitter 1. Where incoming sounds or vibrations from an appliance or device being monitored (not shown) are detected by one more acoustic sensors 11 whose output(s) are connected to a signal conditioner 13 whose output is monitored by a signal recognizer 15. When a predetermined signal is detected by the signal recognizer 15, a wireless notification message is transmitted by means of a wireless chipset 5 to a notification unit 19.

FIG. 2 illustrates an acoustic sensor 11 receives incoming sounds and the wireless chipset 5 relays the incoming sounds to a secondary unit 18. The secondary unit 18 includes the signal conditioner 13 and signal recognizer 15, may include a second wireless chipset 5 that transmits notification messages to the notification unit 19. A plurality of different sensors 11 (not shown), sends signals to a shared signal processor at 17 (not shown) with memory 23 (not shown) which performs signal conditioning and signal recognition functions for all of the incoming signals.

Figure 3:
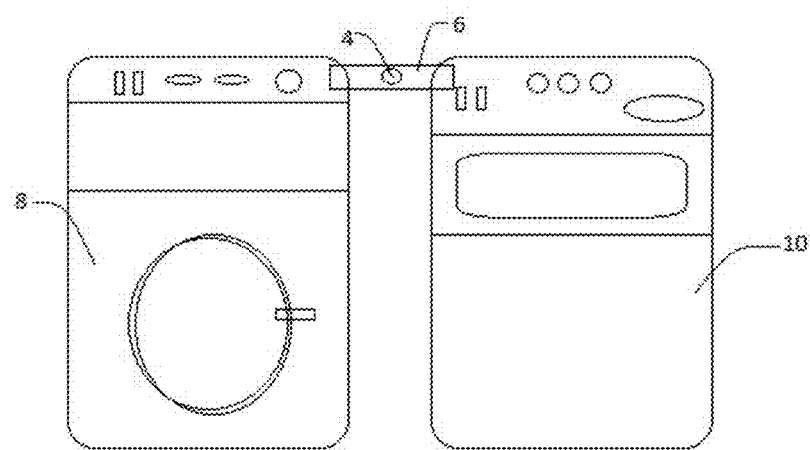
FIG. 3 illustrates one embodiment of a Washer Dryer Alarm (WDA) 4 configured to intermediary 6.

FIG. 3 illustrates one embodiment of the WDA 4 configured to intermediary 6. Intermediary 6 is coupled with dryer 8 and washer 10. WDA 4 is operable to detect and store data about the vibrations from one or more of dryer 8 and washer 10. Data may be stored on the database 46. This data may also be stored on the memory 38 of the WDA 4 or on a notification unit 19.

Figure 4:
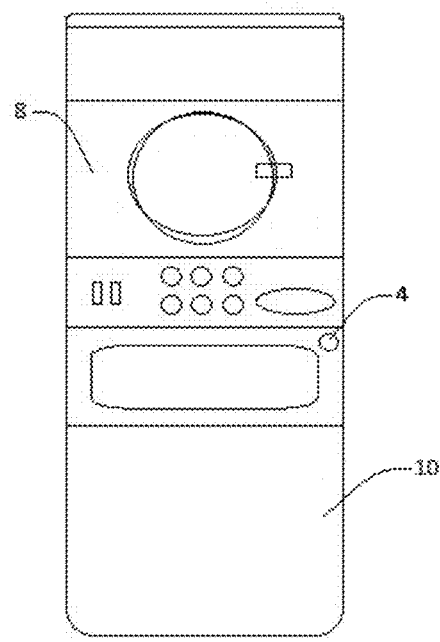
FIG. 4 illustrates a WDA 4 configured to the washer and dryer without an intermediary.

FIG. 4 illustrates the WDA 4 configured to the washer 10 and dryer 8 without an intermediary 6. The washer 10 and the dryer 8 are shown in an alternative configuration as one unit. In this illustration the WDA 4 can sense the vibrations and sounds of the washer 10 and dryer 8 from placement near the middle of the appliances.

FIG. 5 illustrates the WDA 4 communicating with a remotely-located device. The unit of washer 10 and dryer 8 is coupled with cellular smartphone 12 and alternatively personal computer 14 by a wireless signal (e.g. Bluetooth, Wi-Fi). A smartphone 12 and computer 14 are each an example of a notification unit 19.

On the smartphone 12 or computer 14 the notifications would operate through an app designed to take the notification signal and alert the user through sound or vibrations of the device. In some embodiments, this app could also allow the user to control various appliances as well as the triggered signal transmitter 1. For the triggered signal transmitter 1, the user could use the app to enter new sounds and to set the notification parameters. For the appliances, the user could set the temperature of an oven, for instance, or reset the timer. In some recipes, the oven heats at a high temperature for 15 minutes, then the temperature is lowered for the next 45 minutes. If the app could interface with the oven, then the user could stop the oven timer alarm, lower the temperature, and start a new oven timer remotely through the app. This app could be password protected or the triggered signal transmitter 1 could require a password before accepting changes.

In one embodiment, the notification unit 19 could be a Bluetooth programmable light bulb, such as a Philips Hue or an ilumi LED light. In this embodiment, the light could change color, blink, or change intensity based on the alarm.

FIG. 6 illustrates an example GUI of the mobile application 20 as it is shown in one alternative on cellular smartphone 12. Check Status 22 is operable to check the overall status of the device in operation, such as whether or not the device is currently performing a task. Operation Monitor 24 is operable to view a depiction of data regarding the vibrations and sounds that the microphone and accelerometer detect. Power Management 26 is operable to view data regarding the management of power for the device, such as a timer. Signal Configurations 28 is operable to direct signals in a variety of ways including, but not limited to, the type of signals (e.g. Bluetooth, WI-FI), as well as the frequency of the signals that the device sends to an application.

Figure 7:
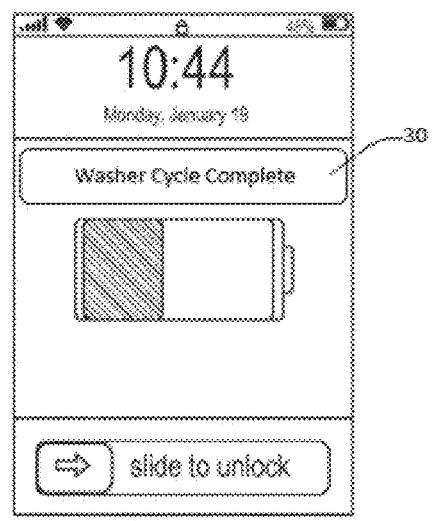
FIG. 7 illustrates an example notification message 30 that is shown on cellular smartphone 12 while the mobile application 20 is running on the device.

FIG. 7 illustrates an example notification message 30 that is shown on cellular smartphone 12 while the mobile application 20 is running on the device. A user may wish to edit the settings of application 20 to restrict the frequency and types of notification messages 30 displayed on the smartphone 12. Settings of an application 20 can be changed on other notification units 15.

Figure 8:
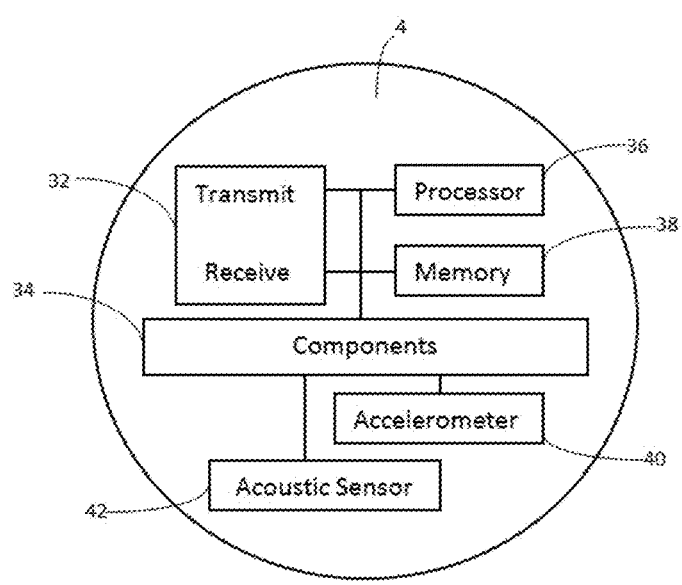
FIG. 8 is a diagram showing the major components of an embodiment of a WDA 4.

FIG. 8 is a diagram showing the major components of an embodiment of a WDA 4. A WDA 4 includes a processor 36 that communicates with various resources. The processor 36 may execute software stored in a memory 38 or may utilize hardwired digital logic to perform logical operations from components 34. The processor 36 communicates with the memory 38 to apply interaction rules that govern the communications. Interaction rules specify when a particular communication should occur, the recipients of the communication, and the information to be conveyed through the communication. Memory 38 may include electronic storage such as RAM, solid state storage, and other magnetic or optical storage.

The processor 36 communicates with a transmitter and a receiver 32 to further communicate with the other devices of the environment. The transmitter and receiver pairs discussed herein for the various embodiments may be separate or incorporated as a transceiver. When an interaction rule specifies that a communication from WDA 4 should occur, the processor 36 controls the transmitter 32 to cause it to send a digital signal. The digital signal may take various forms discussed below depending upon detected vibrations, detected sounds, and settings of the WDA application 20. The receiver 32 receives messages directed to the WDA 4. The communications among devices may be configured so that each device has identification data included in the message so that the processor 36 determines whether a message is relevant to the WDA 4 based on whether particular identification data is present.

Alternatively, other schemes may be used to communicate wherein a parameter of the receiver 32 controls whether a WDA 4 receives the message as one intended for it to be received. Examples of such physical parameters include the particular frequency at which a signal is transmitted or a particular time interval during which the message is transmitted. The transmitter and receiver may be of various forms such as a Bluetooth chip or a wireless transmitter and receiver.

The processor 36 couples with the WDA 4. The WDA 4 may include components 34 that provide filtering and processing of the signals received from the accelerometer 40 and acoustic sensor 11. Components may include a band filter, comparator, and common signal conditioning hardware. For example, an analog-to-digital converter will convert analog signals from the accelerometer 40 and the acoustic sensor 11 to a digital signal for later processing by the WDA application 20. The processor 36 can be separate and distinct from the processing capabilities of the components 34 or alternatively, may be wholly or in-part incorporated into the processing capabilities of the components 34.

The processor 36 can control the operations of the incoming signals from the accelerometer 40 and acoustic sensor 11. The processor 36 can reference interaction rules stored in memory 38 in relation to communications received through receiver 32 from the settings and configurations of application 20 to determine whether to transmit a signal detected only by the accelerometer 40, only by the acoustic sensor 11, or both.

Figure 9:
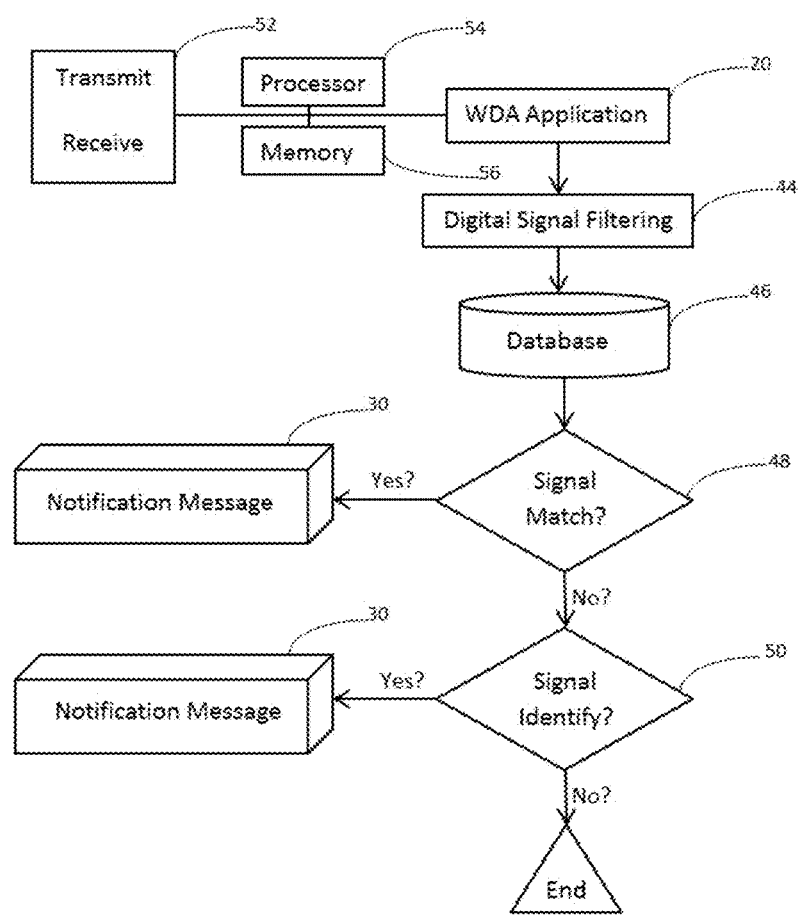
FIG. 9 is an overview block diagram for the signal processing system according to an illustrative embodiment.

FIG. 9 is an overview block diagram for the signal processing system according to an illustrative embodiment.

Processor 54 and memory 56 execute the functionalities of application 20. The WDA application 20 communicates with a transmitter and receiver 52 to obtain the digital signals from the WDA 4. The digital signals are processed by the application 20 to eventually send a notification message 30. A notification message 30 will not always be output. Configurations and parameters of the application 20 and the composition of the incoming digital signals will determine the response.

Digital signal filtering 44 reduces or enhances certain aspects of the signal. The memory 56 stores the filtered signal and then compares the stored signal with the signals in the database 46. The WDA application 20 attempts to find a signal match 48. If the filtered signal sufficiently correlates to a signal in the database 46 then the associated notification message 30 informs the user of the washer or dryer status. If no signal is matched, the WDA application executes signal identification 50 processes. Signals identified through this process can be stored in the database 46 for future signal matching.

The signal identification 50 attempts to identify content in the filtered signals that correlate to a status of the washer and dryer. Upon identification, an appropriate notification message 30 informs the user of the washer or dryer status. In one embodiment, the acoustic sensor 11 senses the sound pressure level has reached a threshold that is indicative of the completion of a wash cycle. After the WDA 4 transmits the signal containing the sound pressure level to the application 20, the signal identifier reads the signal and sends a notification message 30 to inform the user of the terminated wash cycle. Similarly, in another embodiment, the accelerometer 40 senses the ceased vibrations of the dryer. Although the signal match 48 did not find a sufficiently correlated signal in the database 46, the WDA application 20 was able to use the signal identify 50 to send a notification message 30 to inform the user of the completed dryer cycle.

The processor 54 can reference interaction rules stored in memory 56 in relation to communications received through receiver 52 from the application 20. The settings and configurations of the WDA application 20 can determine whether to process a signal detected only by the accelerometer 40, only by the acoustic sensor 11, or both.

The signal match 48 and signal identify 50 are not limited to processing content from only the accelerometer 40 or only the acoustic sensor 11. The signal match 48 and signal identify 50 can process content from both the accelerometer 40 and the acoustic sensor 11 simultaneously to better assess the statuses of the washer and dryer. For example, signal identify 50 may combine the sound pressure level data with the accelerometer data to deduce a particular status of the washer and dryer. An outcome that the WDA application 20 may not arrived at without the data combination.

Figure 10:
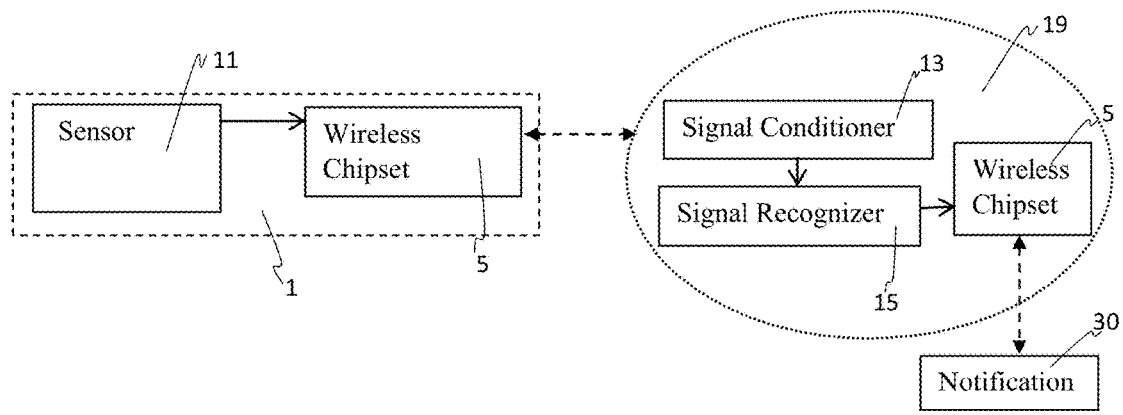
FIG. 10 illustrates the hardware and software architecture for sensing and outputting a notification 30 in one embodiment.

FIG. 10 illustrates the hardware and software architecture for sensing an environment and outputting a notification message 30 in one embodiment. An acoustic of triggered signal transmitter 1 senses environment sounds using an acoustic sensor 11. An acoustic sensor 11 sends a signal based on the environment sounds to a wireless chipset 5 where the signal is transmitted to notification unit 19. The notification unit 19 conditions the signal 3 then attempts to recognize the signal 13. If the signal recognizer 15 matches a corresponding notification message 30 then wireless chipset 5 of the notification unit 19 transmits notification message 30.

Figure 11:
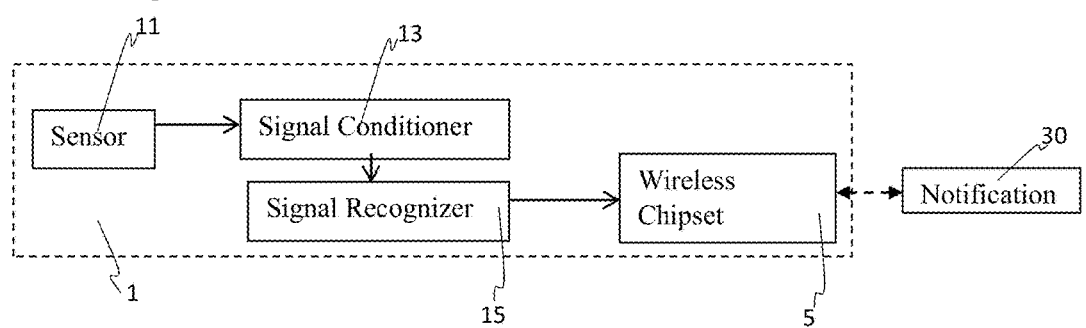
FIG. 11 illustrates the hardware and software architecture for sensing and outputting a notification 30 in a second embodiment.

FIG. 11 illustrates the hardware and software architecture for sensing an environment and outputting notification message 30 in a second embodiment. An acoustic of triggered signal transmitter 1 senses environment sounds using an acoustic sensor 11. A notification unit 19 is not used in this embodiment. The triggered signal transmitter 1 conditions the signal 3 then attempts to recognize the signal 13. If the signal recognizer 15 matches a corresponding notification message 30 then that notification message 30 is sent. The wireless chipset 5 may communicate with a database 46 to send data to the signal recognizer. Alternatively memory 23 on the triggered signal transmitter 1 may contain sound patterns and templates for the signal recognizer 15 to process.

Figure 12:
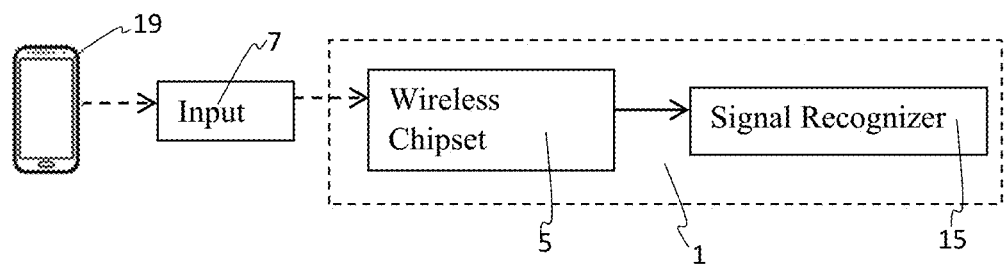
FIG. 12 provides a simplified functional block diagram which illustrates input 7 from the notification unit 19.

FIG. 12 provides a simplified functional block diagram which illustrates input 7 from the notification unit 19. The wireless chipset 5 can receive input 7 from the notification unit 19. The wireless chipset 5 can send the input to the signal recognizer 15 where the signal recognizer can disable further notification messages output that corresponds to the input 7. Triggered signal transmitter 1 may save this preference to disable further notifications on a memory 23.

Figure 13:
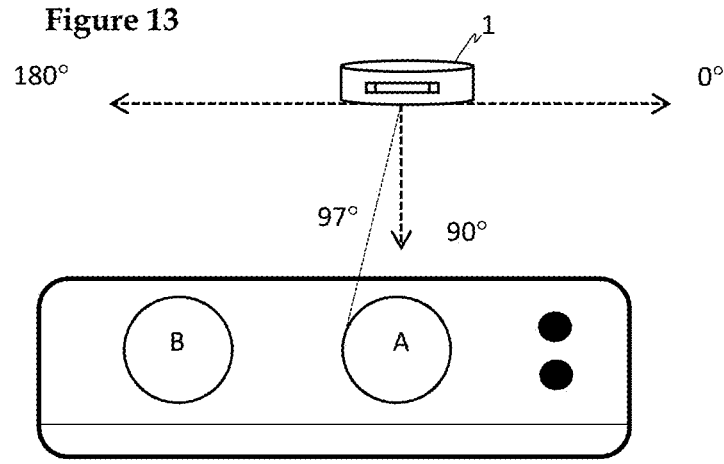
FIG. 13 provides a drawing of the personal household triggered signal transmitter 1 receiving sounds from expected target directions of arrival.

FIG. 13 provides a drawing of the triggered signal transmitter 1 receiving sounds from expected target directions of arrival. FIG. 13 provides one embodiment where the triggered signal transmitter 1 is placed above the stove to monitor two stovetops. In this highly simplified embodiment, the device is used to monitor when water begins to rumble because it is boiling and when water splashes on the stove top because water is spilling out from over-boiling. The triggered signal transmitter 1 monitors stovetop A and stovetop B. An acoustic sensor 11 may be used to monitor sounds on the stovetop. An IR/optical sensor 27 can be used to measure the temperature, steam, and smoke from a cooktop. FIG. 13 helps to illustrate how incident angles are used to determine the expected target direction of arrival for the stove top A. The expected target direction of arrival for boiling water on stovetop A is 90 degrees. The expected target direction of arrival for water spilling is 97 degrees.

In one embodiment, the microphone could be used to pass through sounds to the user. In this instance, the sounds of the kitchen would come through the speaker on the cell phone. This could be invoked by the user with a menu selection (or similar user interface technique such as buttons or commands) in the application on the cell phone. In another embodiment, the triggered signal transmitter 1 could send an "unknown sound" alert to the user and then transmit the sound from the kitchen to the user to hear. The user could then add the sound to the database 46 of sounds or could take other action based on what was heard.

Figure 14:
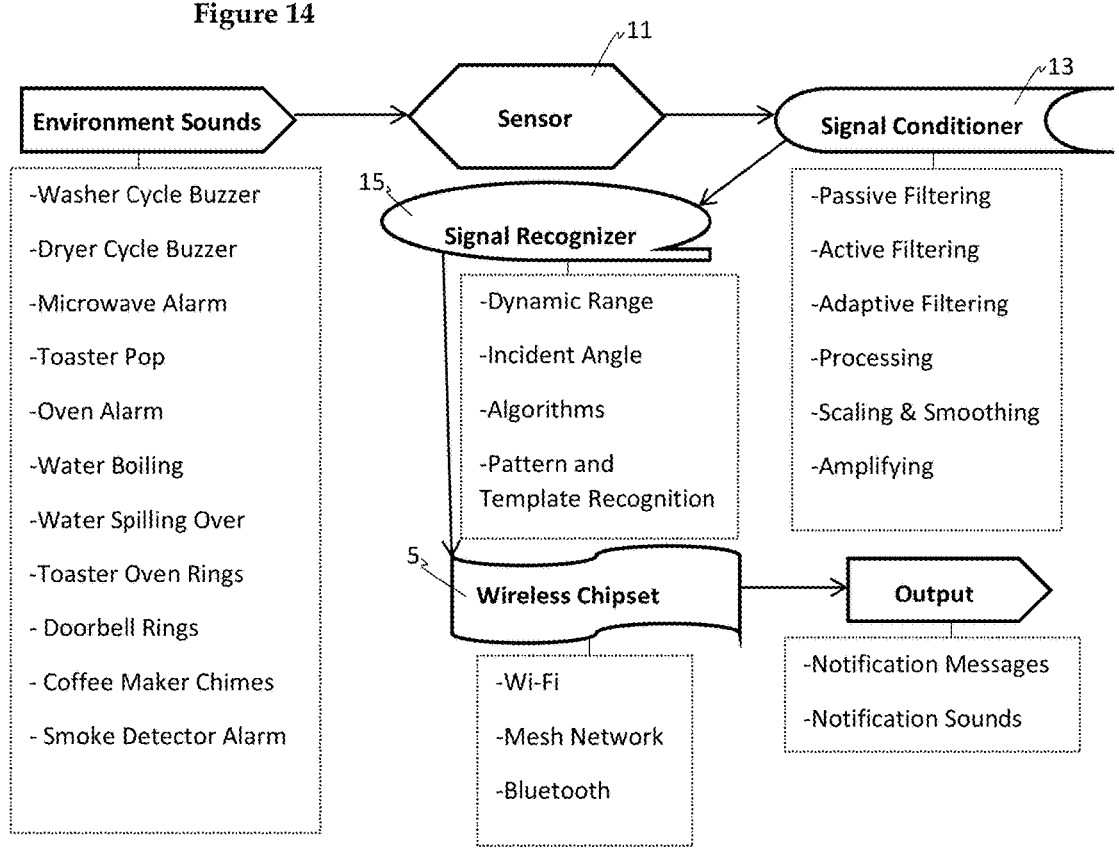
FIG. 14 provides a block diagram of some functions the personal household triggered signal transmitter 1 can execute.

FIG. 14 provides a block diagram of some functions the triggered signal transmitter 1 can execute. Various environment sounds are shown that can be monitored by an acoustic sensor 11. Once the acoustic sensor picks up an environment sound a signal is sent to a signal conditioner 13 where filters and processing can occur. The signal is then sent to a signal recognizer 15 where a comparison process begins. If a signal is recognized and has a corresponding notification then the notification is sent to a wireless chipset 5. Where the notification 30 is output.

Figure 15:
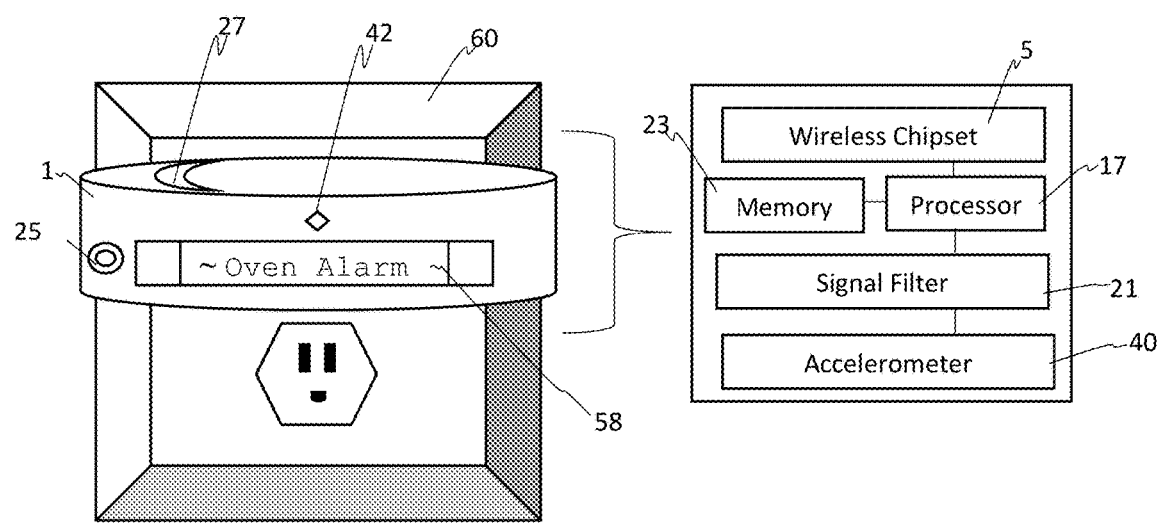
FIG. 15 illustrates a triggered signal transmitter 1 plugged into a power receptacle 60 with a block diagram of the electrical components within the triggered signal transmitter 1.

FIG. 15 illustrates a triggered signal transmitter 1 plugged into a power receptacle 60 with a block diagram of the electrical components within the triggered signal transmitter 1. The triggered signal transmitter plugs directly into the power receptacle 60 to receive power. The triggered signal transmitter may contain a battery (not shown) to remain powered during energy outages or emergency situations where power is not present. The triggered signal transmitter 1 in this illustrative example has an acoustic sensor 11 placed in a central location. This acoustic sensor 11 may be comprised of a microphone array so the directionality of sounds may be determined. Triggered signal transmitter 1 includes a speaker 25 where audio notification or recipe instructions can be output. An IR sensor/optical sensor 27 positioned on top of the triggered signal transmitter 1 to detect if the lights are on or if smoke is present. IR sensor/optical sensor 27 can also determine the temperature of the environment.

FIG. 15 includes an optional display 58 this display can show what has been sensed by the triggered signal transmitter 1. The display 58 can scroll text across the screen for longer messages. Even though notifications may be sent to a notification unit 19 the display 58 can relay sensed actions. The display 58 and speaker 25 may alert a user of a safety concern in addition to sending the alert to a notification unit 19.

FIG. 15 includes electrical components of the triggered signal transmitter 1. A wireless chipset 5 (e.g., Bluetooth, Cypress PSoC) includes or is coupled to a processor 17 with memory 23. A signal filter 21 processes sounds from acoustic sensor 11 before sending a signal to a notification unit 19 via the wireless chipset 5. The triggered signal transmitter 1 includes an accelerometer 40 to detect vibrations in the environment.

Figure 16:
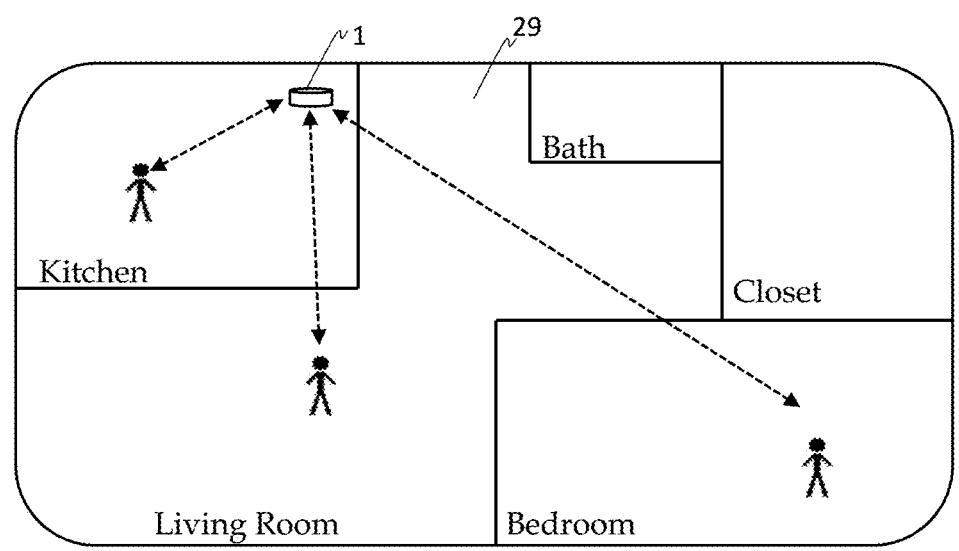
FIG. 16 illustrates notification suppression based on the power level of wireless signals.

FIG. 16 illustrates notification suppression based on the power level of wireless signals. In this embodiment, there are three users in an apartment 29. A first user is in the kitchen. A second user is in the living room. A third person is in the bedroom. A triggered signal transmitter 1 is in the kitchen. In one example, an oven alarm rings in the kitchen. The acoustic sensor 11 senses the alarm and before the notification 30 is sent to all three users' notification units 19 a power level signal check is sent to each user's notification unit 19. The user in the kitchen returns a high power level signal (e.g. RSSI) therefore the notification 30 for the oven alarm is suppressed.

Figure 17:
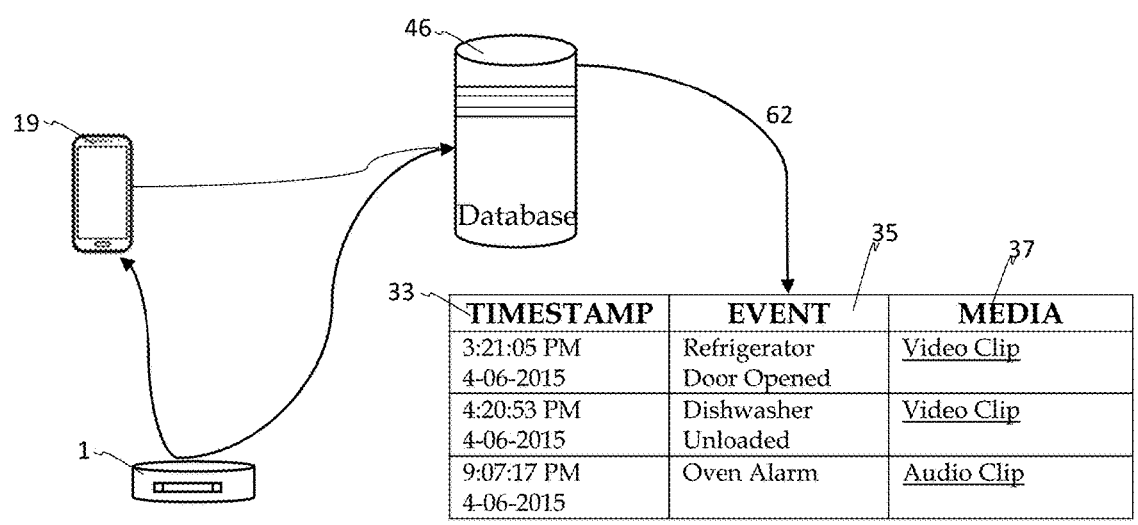
FIG. 17 illustrates a database with time stamped events based on environment signals.

FIG. 17 illustrates a database 46 with time stamped events based on environment signals. Data from events 35 that are sensed by the triggered signal transmitter 1 may be sent to a database 46 directly. Or the data from events 35 may be sent to a notification unit 19 before being sent to a database 46. Once the data is sent to a database 46 the data is categorized/indexed 62 into a form that is more readily accessible to a user. Data can include a timestamp 33 with the time and date an event 35 occurred. Media 37 from the time an event occurred can also be included. Media 37 may include video feeds from an environment from the same time as the event, audio from the time, or audio and video.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of an application of the principles of the present invention. Also, the devices used herein are described in their application to a number of objects, however this list is not exhaustive. The teachings herein are applicable to monitoring of any and all different types of objects. Moreover, the various processors and electronic hardware elements described herein can be implemented using a variety of standard or custom circuits, packaged as a single chip or multiple interconnected circuits. Likewise the processes described herein can be implemented using hardware, software consisting or computer-readable program instructions, or a combination of hardware and software. Accordingly, this description is meant to be taken only by way of example, and not to otherwise limit the scope of this invention.

What is claimed is:

1. A method of notifying a user when a household appliance indicates a condition of potential interest to the user comprising, in combination, the steps of:
    employing one or more sensors to convert a condition of potential interest into an output signal using a signal processor;
    transmitting the output signal to a remotely located computing device;
    comparing, in the computing device, the output signal to a searchable database of stored conditions by comparing identification values that represent the output signal to identification values that are in the searchable database, each of which is associated in the searchable database with status identifying information and notification parameters, the notification parameters specifying stored conditions related to the determination of whether to issue notifications and how to issue notifications;
    searching for the location of a user by transmitting a message over a communications network to the remote device associated with the user;
    determining a distance between the household appliance and the user;
    using the distance and the notification parameters to sound an alert on the appliance if the distance is within a notification parameter value; and
    producing an alert notification indication on the remote device when the distance is not within the notification parameter value.

2. The method claim 1 wherein the distance is determined by calculating a time for the message to travel between the household appliance and the remote device.

3. The method of claim 1 wherein the distance is determined using a received signal strength value from the message transmitted between the household appliance and the remote device.

4. The method of claim 1 wherein the distance between the household appliance and the remote device is determined using a global or internal positioning system.

5. The method of claim 1 wherein the communications network uses a Bluetooth protocol.

6. The method of claim 1 wherein the communications network uses a Wi-Fi protocol.

7. The method of claim 1 wherein a sound volume of the alert notification is proportional to the distance.

8. The method of claim 1 wherein a sound volume of the alert notification is proportional to the distance and to ambient sounds.

9. The method of claim 1 wherein the household appliance is a washing machine.

10. The method of claim 1 wherein the household appliance is a dryer.

11. The method of claim 1 wherein the household appliance is a microwave oven.

12. The method of claim 1 wherein the household appliance is an oven.

13. A household appliance that notifies one or more users when a condition of potential interest occurs, the household appliance comprising:
    a special purpose computing processor electrically connected to the household appliance to receive power and signals related to the conditions of potential interest;
    a memory connected to the computing processor;
    a speaker connected to the computing processor;
    a communications transceiver connected to the computing processor, configured to be wirelessly connected to remote devices proximate to the one or more users;
    the memory, computing processor speaker, and the communications transceiver physically mounted in the household appliance;
    wherein the computing processor is configured to search for a location of the one or more users by transmitting a message over the communications transceiver to the remote device associated with the one or more users in order to determine either a distance between the household appliance and the remote devices, or the one or more users having a profile associated with the household appliance;
    wherein a notification table, contained within the memory, is configured to establish the profile for the one or more users;
    wherein the computing processor looks up notification parameters based on the signals and uses the distance, profile, and the notification parameters to activate the speaker if the distance is within a notification parameter value or sends a message to the remote devices if the distance is not within the notification parameter value or sends a message if the profile of the one or more users corresponds to the household appliance.

14. The household appliance of claim 13 wherein the distance calculation uses a time of flight algorithm.

15. The household appliance of claim 13 wherein the distance calculation uses a signal strength algorithm.

16. The household appliance of claim 13 further comprising a global or local positioning system, the positioning system connected to the computing processor and providing location information used in the distance calculation.

17. The household appliance of claim 13 wherein the communication transceiver communicates using a Bluetooth protocol.

18. The household appliance of claim 13 wherein the communication transceiver communicates using a Wi-Fi protocol.

19. The household appliance of claim 13 wherein the communication transceiver communicates using a cellular protocol.

20. A method of notifying a user when a sound in the household indicates a condition of potential interest to said user comprising, in combination, the steps of:
    employing one or more sensors to convert ambient sounds into an output signal using a signal processor, wherein the ambient sounds include a human voice and the output signal incorporates an unique value related to a specific human based on the human voice;
    transmitting the output signal to a remotely located computing device;
    comparing said output signal to a searchable database of stored control sounds by comparing identification values that represent said output signal to identification values that are in the searchable database, each of which is associated in the searchable database with status identifying information and notification parameters, said stored control sounds related to household sounds, and said notification parameters specifying conditions related to the determination of whether to issue notifications,
    producing an alert notification indication when said output signal matches one of said stored control sounds and when said conditions in said notification parameters for the matching stored control sounds are satisfied, in response to said notification alert indication, transmitting a wireless alert message containing the status identifying information associated with the matched control sound to a remotely located notification unit located near said user, and employing said notification unit to produce an output that is perceptible to said user and that is indicative of the existence of said condition of potential interest.

* * * * *